(12) United States Patent
Inagaki et al.

(10) Patent No.: US 7,078,832 B2
(45) Date of Patent: Jul. 18, 2006

(54) LINEAR MOTOR, AND LINEAR COMPRESSOR USING THE SAME

(75) Inventors: Ko Inagaki, Kanagawa (JP); Ichiro Morita, Kanagawa (JP)

(73) Assignee: Matsushita Refrigeration Company, Shiga (JP)

( * ) Notice: Subject to any disclaimer, the term of this patent is extended or adjusted under 35 U.S.C. 154(b) by 0 days.

(21) Appl. No.: 10/493,495

(22) PCT Filed: Oct. 15, 2003

(86) PCT No.: PCT/JP03/13214

§ 371 (c)(1),
(2), (4) Date: Apr. 22, 2004

(87) PCT Pub. No.: WO2004/097557

PCT Pub. Date: Nov. 11, 2004

(65) Prior Publication Data
US 2004/0251748 A1    Dec. 16, 2004

(30) Foreign Application Priority Data
Oct. 16, 2002 (JP) ............................. 2002-301626
Oct. 16, 2002 (JP) ............................. 2002-301627

(51) Int. Cl.
*H02K 41/10* (2006.01)

(52) U.S. Cl. ........................... 310/12; 310/13; 310/15; 355/238

(58) Field of Classification Search ............... 310/12, 310/13, 15, 105, 14; 335/238; 300/17
See application file for complete search history.

(56) References Cited

U.S. PATENT DOCUMENTS

| 3,777,722 A | 12/1973 | Lenger |
| 4,190,402 A | 2/1980 | Meece et al. |
| 5,525,845 A | 6/1996 | Beale et al. |
| 5,751,075 A | 5/1998 | Kwon et al. |
| 5,814,907 A * | 9/1998 | Bandera ..................... 310/14 |
| 5,833,211 A * | 11/1998 | Berling .................. 251/129.15 |
| 5,907,201 A | 5/1999 | Hiterer et al. |
| 6,024,544 A | 2/2000 | Kim et al. |
| 6,050,556 A | 4/2000 | Masuda et al. |
| 6,129,527 A | 10/2000 | Donahoe et al. |

(Continued)

FOREIGN PATENT DOCUMENTS

EP    0 864 750    9/1998

(Continued)

OTHER PUBLICATIONS

Patent Abstracts of Japan, vol. 1998, No. 01, Jan. 30, 1998 & JP 09 250457 A (Max Co., Ltd.), Sep. 22, 1997, *Abstract*.

*Primary Examiner*—Darren Schuberg
*Assistant Examiner*—Iraq A. Mohandesi
(74) *Attorney, Agent, or Firm*—Wenderoth, Lind & Ponack, L.L.P.

(57) ABSTRACT

A linear motor of the present invention has: a stator having a stationary iron core and a magnet wire; a mover having a moving iron core and a magnet; and a plate-shaped elastic member for supporting the mover in a manner to rock in the rocking directions. This construction eliminates a sliding portion for supporting the mover so that it can reduce the loss, which might otherwise accompany the reciprocation of the mover. Moreover, a linear compressor using this linear motor is high in efficiency and reliability.

30 Claims, 20 Drawing Sheets

U.S. PATENT DOCUMENTS

| | | |
|---|---|---|
| 6,413,057 B1 | 7/2002 | Hong et al. |
| 6,809,434 B1 * | 10/2004 | Duncan et al. ............... 310/12 |
| 6,815,847 B1 * | 11/2004 | Duncan et al. ............... 310/12 |
| 6,847,132 B1 * | 1/2005 | Ukaji ......................... 310/12 |
| 6,867,512 B1 * | 3/2005 | Delaire et al. ............... 310/14 |
| 2003/0164647 A1 * | 9/2003 | Kobayashi et al. ........... 310/12 |
| 2004/0189103 A1 * | 9/2004 | Duncan et al. ............... 310/12 |

FOREIGN PATENT DOCUMENTS

| | | |
|---|---|---|
| EP | 1 167 765 | 1/2002 |
| GB | 145694 | 10/1921 |
| JP | 3-112354 | 5/1991 |
| JP | 9-172764 | 6/1997 |
| JP | 2912024 | 4/1999 |
| JP | 2000-50609 | 2/2000 |
| JP | 2001-73942 | 3/2001 |
| WO | 94/00906 | 1/1994 |
| WO | 00/14410 | 3/2000 |
| WO | 02/077454 | 10/2002 |

* cited by examiner

LINEAR MOTOR, AND LINEAR COMPRESSOR USING THE SAME

TECHNICAL FIELD

The present invention relates to a linear motor and a linear compressor using the linear motor and used in a refrigerating cycle or the like.

BACKGROUND ART

In recent years, a necessity for a high efficiency of a refrigerating apparatus rises more and more. For this necessity, a compressor using a linear motor is expected to reduce the sliding loss drastically because it has a simple mechanical construction. Therefore, the compressor is widely employed to raise the efficiency of the refrigerating apparatus. A conventional linear compressor will be described with reference to the accompanying drawing.

FIG. 21 is a sectional view of the conventional linear compressor. A closed casing (as will be called the "case") 1 houses a body 3 having a linear motor 2 and holds lubricating oil 4.

The linear motor 2 is constructed of a stator 9 and a mover 12. The stator 9 is composed of a first silicon steel sheet layer (as will be called the "steel sheet layer") 6 having a hollow cylinder shape, and a second silicon steel sheet layer (as will be called the "steel sheet layer") 8 of a hollow cylinder shape provided with a coil 7 and formed at a predetermined clearance on the outer circumference of the steel sheet layer 6. Both the steel sheet layers 6 and 8 are held in a frame 5. The mover 12 is loosely inserted between the steel sheet layer 6 and the steel sheet layer 8 and is formed into a hollow cylinder shape by adhering a plurality of magnets 11 to the distal end portion of a magnet shell 10 made of a non-magnetic material. Here, the magnets 11 are generally made of a magnet material of a rare earth element having a ferromagnetic field such as neodymium, and are magnetized in a direction perpendicular to the rocking direction of the mover 12.

A cylinder 14 having a cylindrical bore and a piston 15 inserted reciprocally in the cylinder 14 form a bearing section 16 inbetween. The piston 15 and the magnet shell 10 are integrally formed in a coaxial shape. Moreover, the cylinder 14 is arranged on the inner side of the steel sheet layer 6 formed in a hollow cylinder shape, and has the frame 5 formed on its outer circumference.

The piston 15 is formed into such a hollow cylinder shape as to form a suction passage (as will be called the "passage") 17 in its internal space. In the open end of the passage 17 on the side of a compression chamber 18, there is mounted a suction valve (as will be called the "valve") 19. A discharge valve (as will be called the "valve") 20 is also arranged in the open end of the compression chamber 18.

The cylinder 14, the piston 15 and the steel layers 6 and 8 share their axes. The piston 15 retains the mover 12, through the bearing section 16 between itself and the cylinder 14. As a result, the magnet 11 holds predetermined clearances between itself and the steel sheet layer 6 and the steel sheet layer 8, respectively.

Both an inner resonance spring (as will be called the "spring") 21 and an outer resonance spring (as will be called the "spring") 22 are compression coil springs. The spring 21 is arranged to contact with the steel sheet layer 6 and the magnet shell 10, and the spring 22 is arranged to contact with the magnet shell 10 and an outer frame 23. Both the springs 21 and 22 are assembled in compressed states. On the other hand, an oil pump 24 is formed in the bottom portion of the body 3 and is positioned in the lubricating oil 4.

Here will be described the actions of the linear compressor thus constructed.

First of all, when an electric current is fed to magnetize the coil 7, a loop of a series of magnetic fluxes is generated to form a magnetic circuit from the steel sheet layer 6 to the clearance, the magnet 11, the clearance, the steel sheet layer 8, the clearance, the magnet 11, the clearance and the steel sheet layer 6. The magnet 11 is attracted by the magnet poles, which are formed in the steel sheet layer 8 by those magnetic fluxes. When the electric current to the coil 7 then alternates, the mover 12 reciprocates horizontally in FIG. 21 between the steel sheet layer 6 and the steel sheet layer 8. As a result, the piston 15 connected to the mover 12 reciprocates in the cylinder 14. By the reciprocating motion, the coolant gas in the space of the case 1 is sucked via the passage 17 out of the valve 19 into the compression chamber 18 so that it is compressed in the compression chamber 18 and discharged from the valve 20.

The spring 21 is sandwiched between the cylinder 14 and the steel sheet layer 6 and supports the inner side of the mover 12 elastically. The spring 22 supports the outer side of the mover 12 elastically. When the mover 12 reciprocates, the springs 21 and 22 convert the linear reciprocation of the piston 15 and store them as an elastic energy. The spring 21 and the spring 22 induce the resonating motions while converting the stored elastic energy into linear motions.

On the other hand, the oil pump 24 is caused to feed the lubricating oil to the bearing section 16 by the vibrations of the compressor body 3. Such a compressor is disclosed in Japanese Patent Unexamined Publication No. 2001-73942, for example.

In the conventional construction described above, however, the mover 12 rocks between the steel sheet layer 6 and the steel sheet layer 8. Specifically, it is necessary that the mover 12 be prevented from contacting with both the steel sheet layers 6 and 8. For this necessity, the clearances are individually formed between the mover 12 and the steel sheet layers 6 and 8. However, these clearances of the two layers act as magnetic resistances to reduce the magnetic fluxes in proportion to the distances. In order to achieve a thrust needed for driving the mover 12, however, it is necessary to increase the electric current to be fed to the coil 7 to provide an excess of current to compensate for the reduction in the magnetic fluxes due to the two clearances. As a result, the electric current to be inputted must be increased thereby making it difficult to enhance the efficiency.

In order to achieve the thrust needed for driving the mover 12, on the other hand, the magnet 11 has to be enlarged in the conventional linear motor. However, the magnet 11 employs an expensive rare earth element as its material so that the cost drastically rises as the magnet 11 becomes larger.

If there is a difference in the distances between the clearances to be formed between the mover 12 and the steel sheet layers 6 and 8, moreover, an imbalance in the magnetic attractions occurs between the magnet 11 and the steel sheet layers 6 and 8. As a result, a wrenching force perpendicular to the rocking directions of the mover 12 is generated so that a sliding loss occurs at the bearing section 16 composed of the piston 15 and the cylinder 14. Alternatively, an abnormal wear occurs at the bearing section 16 to shorten the lifetime of the compressor. On the other hand, noises are caused by the sliding when the wrenching force between the piston 15 and the cylinder 14 is so high as to cause the wear. Therefore, it is desired that the clearances have an equal distance at any place.

For avoiding this trouble, there is a method for enlarging the distances of the two clearances to thereby reduce the ratio of the differences in the distances. In this construction, however, it is necessary not only to increase the input for the necessary thrust but also to enlarge the magnet 11. It is, therefore, customary to enhance the working precision of the drive system containing the magnet shell 10. In order to enhance the working precision, the magnet shell 10 acting as the moving part has to be thickened for a higher rigidity. As a result, the drive system has an increased weight. And the thrust necessary for driving the mover 12 increases to make it necessary to increase the electric current to be fed to the coil 7. Moreover, the load to be borne by the bearing section 16 rises to increase the sliding loss.

On the other hand, the magnet shell 10 and the piston 15 are connected to each other outside of the steel sheet layers 6 and 8, and the spring 21 is arranged between the magnet shell 10 and the steel sheet layer 6. Therefore, the magnet shell 10 has an axially long shape. In this shape, the rigidity is liable to become low especially at the distal end portion carrying the magnet 11. For retaining the precision, therefore, it is necessary to enhance the rigidity. For this necessity, countermeasures are taken by making the sheet thicker to thereby increase the weight more.

Moreover, it is essential for reducing the imbalance of the magnetic attractions that the assembly be made highly precise for even clearances, in addition to the working precision. Because of the two clearances, both the clearances inside and outside of the magnet shell 10 have to be managed thereby requiring strict management of the precision during manufacturing thereby raising the cost.

If the magnet shell 10 of the hollow cylinder shape is formed of a thin sheet for the lower weight, the rigidity of the magnet shell 10 or its supporting structure is insufficient. As a consequence, the imbalance of the magnetic attractions occurs due to the variation in the parts precision, the assembly precision or the magnetic force of the magnet 11, and the supporting structure is deformed so that the magnet 11 is radially attracted. Then, the magnet 11 and the steel sheet layers 6 and 8 approach respectively in the two clearances of the two layers to thereby cause the vicious circle, in which the magnetic attractions are intensified more to make the eccentricity of the magnet 11 more. As a result, the magnet shell 10 is subjected to a serious force so that it is deformed to generate noises. In the worst case, the steel sheet layers 6 and 8 and the magnet 11 collide against each other to cause breakage.

DISCLOSURE OF THE INVENTION

A linear motor of the present invention has: a stator including a stationary iron core and a magnet wire; a mover including a moving iron core and a magnet; and plate-shaped elastic members for supporting the mover in a manner to rock in the rocking directions. Moreover, a linear compressor of the present invention has: the aforementioned linear motor; a cylinder sharing an axis in the rocking directions of the mover; and a piston inserted reciprocally in the cylinder and connected to the mover.

DETAILED DESCRIPTION OF PREFERRED EMBODIMENTS

Figure 1:
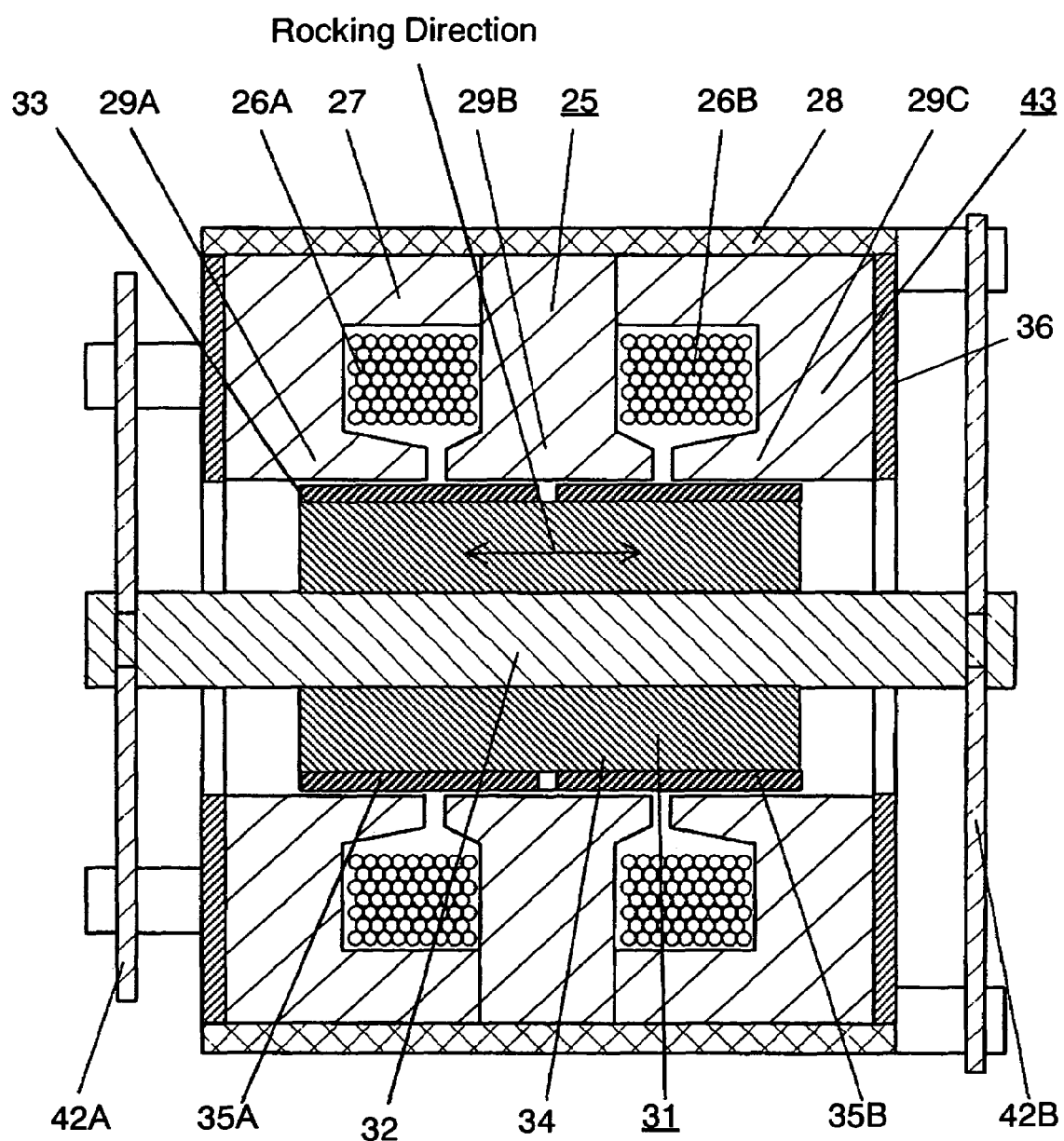
FIG. 1 is a sectional side elevation of a linear motor according to a first exemplary embodiment of the present invention.

Embodiments of a linear motor and a linear compressor according to the invention will be described with reference to the accompanying drawings. Here in the individual embodiments, the detailed description of components having similar constructions will be omitted by designating them with common reference numerals.

Exemplary Embodiment 1

Figure 2:
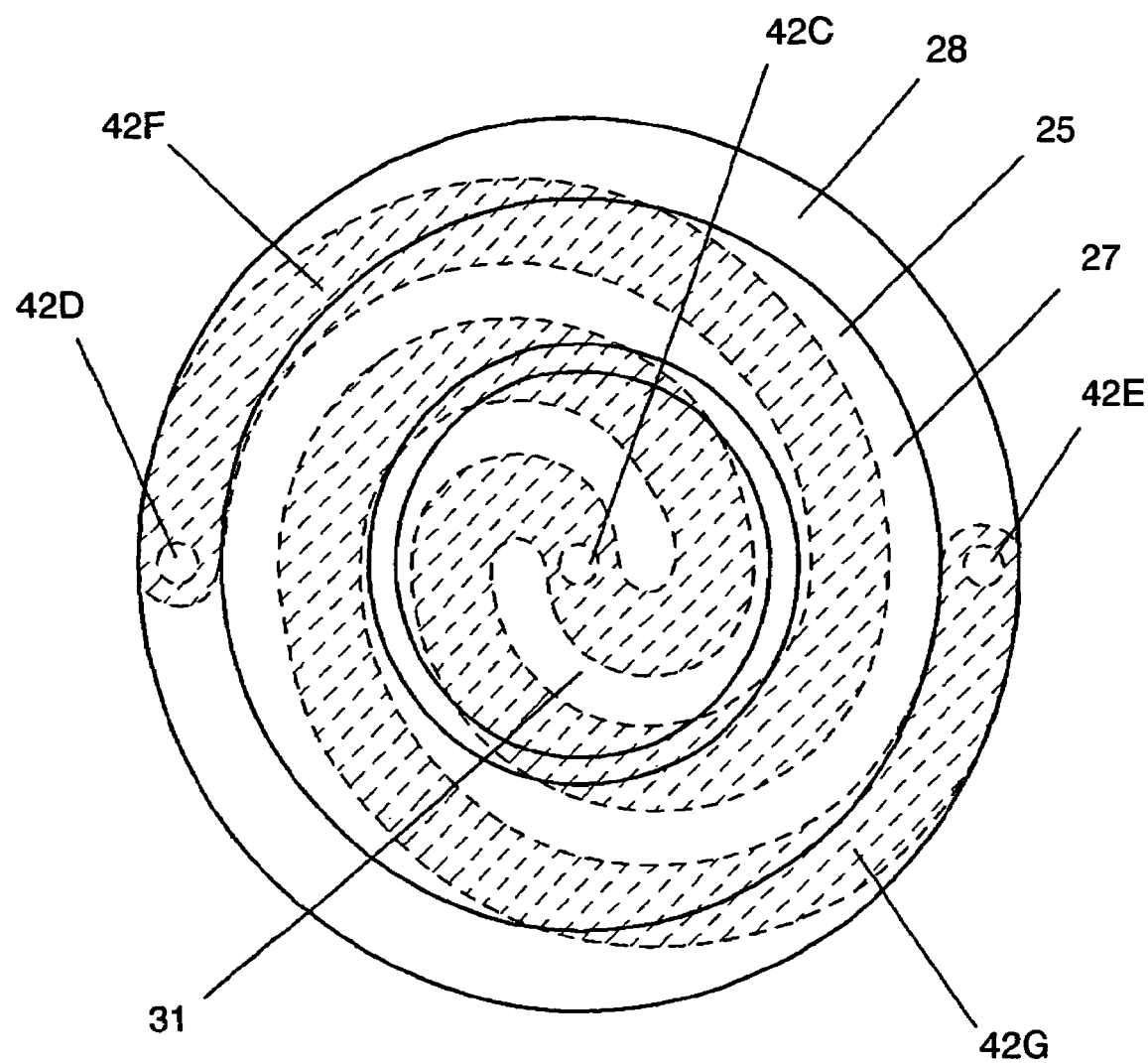
FIG. 2 is a schematic diagram showing relative positions of planar springs in the linear motor of FIG. 1.
Figure 3:
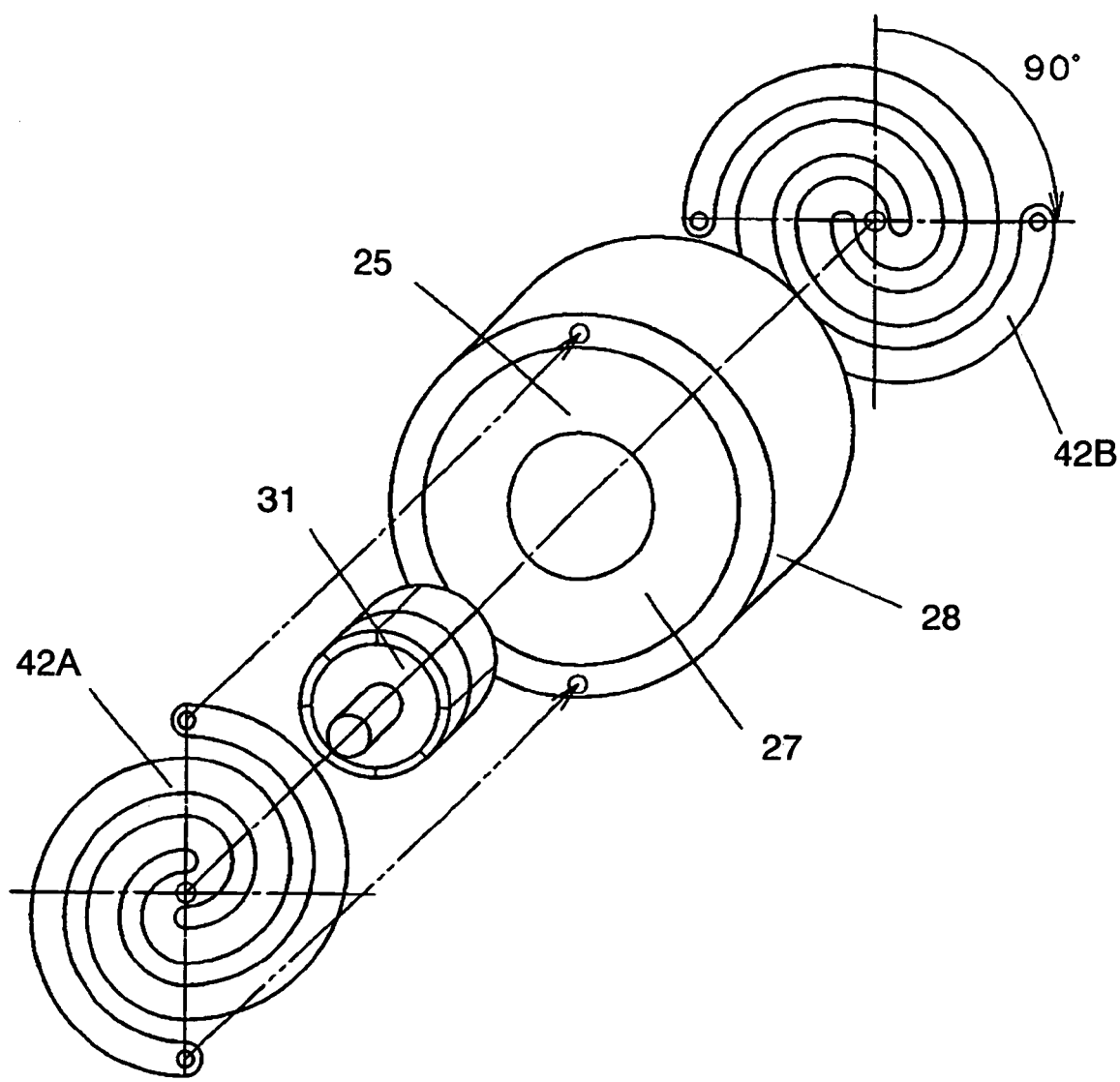
FIG. 3 is an exploded perspective view of the linear motor of FIG. 1.
Figure 4:
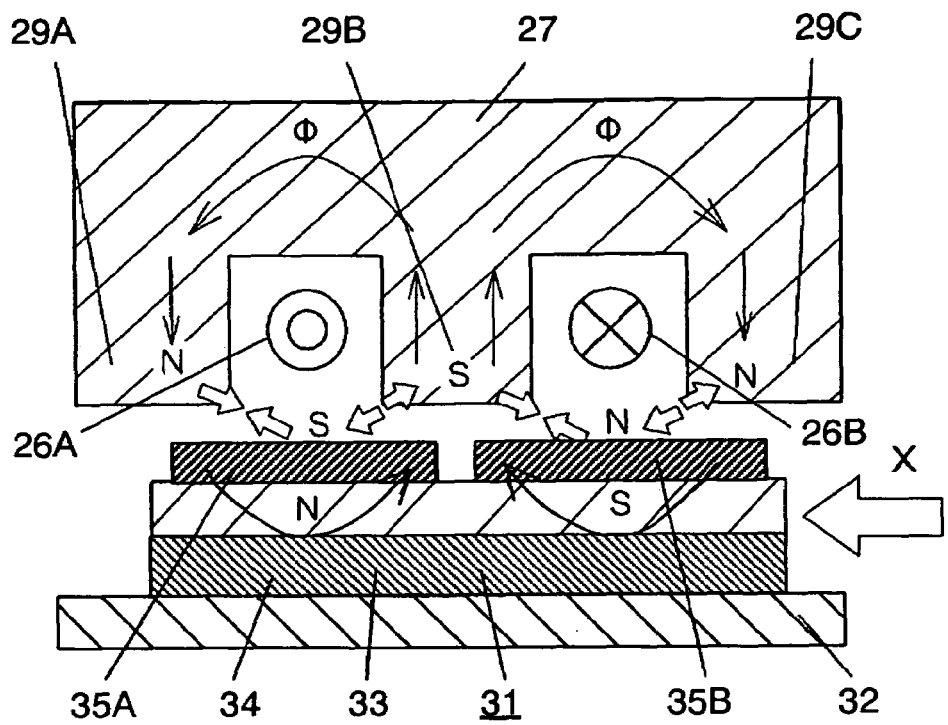
FIG. 4 is a schematic diagram showing the action principle of the linear motor of FIG. 1.
Figure 5:
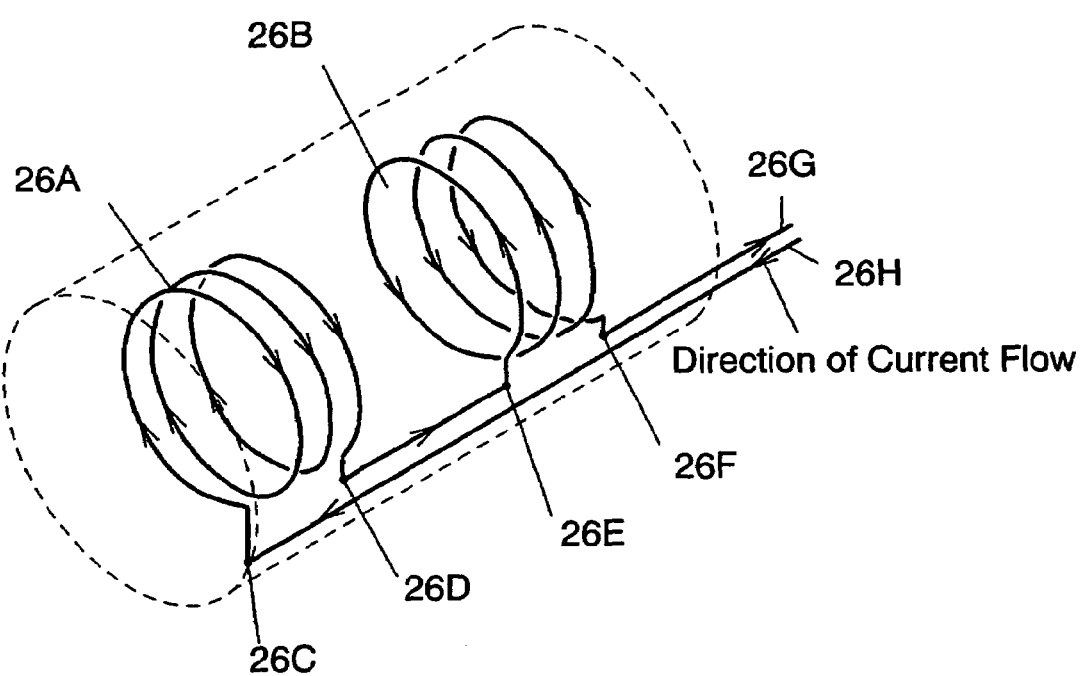
FIG. 5 is a schematic diagram showing the flow of an electric current in the linear motor of FIG. 1.

FIG. 1 is a sectional side elevation of a linear motor according to the first exemplary embodiment of the present invention. FIG. 2 is a schematic diagram showing the relative positions of planar springs, and perspectively shows a mover 31, a stator 25 and a planar spring 42B, from the side of a planar spring 42A in FIG. 3. FIG. 3 is an exploded perspective view showing the assembly of the linear motor, FIG. 4 is a schematic diagram showing the action principle of the linear motor, and FIG. 5 is a schematic diagram showing the directions in which the electric current of the linear motor flows.

The stator 25 of a generally cylindrical shape includes two magnet wires 26A and 26B wound in a ring shape, a stationary iron core 27, and a frame 28 supporting the outer circumference of the stationary iron core 27. The stationary iron core 27 houses the magnet wires 26A and 26B and forms three magnet poles 29A, 29B and 29C on its inner circumference.

The stationary iron core 27 is formed by arraying silicon steel sheets (not shown), which are magnetically non-oriented and highly permeable and which are represented by a non-oriented electromagnetic steel strip of JIS C2552, for example, radially with respect to the axis of the cylinder. The stationary iron core 27 is assembled by forming the magnet poles 29A, 29B and 29C on the inner circumference and by clamping the magnet wires 26A and 26B wound in advance in the ring shape.

The end portions 26C, 26D, 26E and 26F of the coils of the magnet wires 26A and 26B are led out of the clearances of the radially arranged steel sheets of the stationary iron core 27. As shown in FIG. 5, the end portions 26C, 26D, 26E and 26F are so connected that the directions for the electric currents to flow around the axis are reversed from each other in the magnet wires 26A and 26B. The end portions 26G and 26H are led out of the stationary iron core 27 by making use of the electrically insulated conductors (not shown).

The mover 31 is formed into such a generally cylindrical shape as to share the axis with the stator 25, and is housed in the stator 25 in a manner to rock in the axial directions. The mover 31 has a moving iron core 34 and magnets 35A and 35B. The moving iron core 34 is formed by integrating a shaft 32 made of a ferrous material, radially on the axis with thin sheet portions 33, in which silicon steel sheets of a high permeability are arrayed on the outer circumference of the shaft 32. Like the silicon steel sheets forming the stationary iron core 27, the sheet portions 33 are made of a silicon steel sheet, which is represented by the non-oriented electromagnetic steel strip of JIS C2552, for example. The magnets 35A and 35B are fixed by an adhesive on the outer circumference of the moving iron core 34 through a predetermined clearance from the inner circumference of the stator 25, and are axially separated. The magnets 35A and 35B have different magnet poles individually on the principal faces confronting the stationary iron core 27. The magnets 35A and 35B are made of magnets containing a rare earth element to have a ferromagnetic field.

End plates 36 are donut-shaped plates attached to the two end faces of the stationary iron core 27 of the stator 25. These end plates 36 improve the strength of the silicon steel sheets arrayed radially to form the stationary iron core 27. When the end plates 36 are made of a non-magnetic material such as stainless steel, moreover, the leakage of the magnetic fluxes from the silicon steel sheets of the stator 25 is prevented to improve the motor efficiency. For simplicity, the end plates 36 are not explicitly shown in FIG. 3.

The planar springs 42A and 42B are arranged on both axial sides of the mover 31. The planar springs 42A and 42B have an elasticity and are made of a metal sheet with high flexibility, specifically, a ferrous material such as spring steel, tool steel or stainless steel, for example. The planar springs 42A and 42B are provided with three through holes at three portions: a center portion 42C; and distal ends 42D and 42E of the two helical arms. The center portion 42C is joined to the shaft 32 of the mover 31 by means of a bolt, and the distal ends 42D and 42D are individually joined to the frame 28 of the stator 25 by means of bolts. The planar springs 42A and 42B constitute an elastic member.

The planar spring 42A is so attached that arm portions 42F and 42G leading from the center portion 42C to the distal ends 42D and 42E extend counter-clockwise, as viewed from the side of the planar spring 42A of FIG. 3. The planar spring 42B is also attached in a similar manner. As shown in FIG. 3, moreover, the attaching angle of the planar spring 42A to the frame 28 is turned by about 90 degrees from the attaching angle of the planar spring 42B to the frame 28. As a result, the positions of the arm portions 42F and 42G are not aligned on the two sides of a linear motor 43.

By these planar springs 42A and 42B, the mover 31 is supported in a manner to rock in the axial direction while confronting the magnet poles 29A and 29B of the stator 25 through a predetermined clearance. Thus, the mover 31, the stator 25 and so on constitute the linear motor 43.

The actions of the linear motor 43 thus constructed will be described mainly with reference to FIG. 4.

When the magnet wires 26A and 26B are fed with the electric current, magnetic fluxes $\Phi$ are generated to loop to the stationary iron core 27, the clearance, the magnet 35A, the moving iron core 34, the magnet 35A, the clearance and the stationary iron core 27, as indicated by arrows. Other magnetic fluxes $\Phi$ are generated to loop to the stationary iron core 27, the clearance, the magnet 35B, the moving iron core 34, the magnet 35B, the clearance and the stationary iron core 27. By these magnetic fluxes $\Phi$, the magnet poles 29A, 29B and 29C are magnetized to the N-pole, the S-pole and the N-pole, respectively. Since the outer surfaces of the magnets 35A and 35B are magnetized to the S-pole and the N-pole, respectively, the forces of attraction and repulsion are generated, as indicated by blank arrows, between the individual magnet poles and the individual magnets. As a consequence, the mover 31 is driven in the direction of arrow X.

Next, when the magnet wires 26A and 26B are fed with the electric current in the reverse direction, the actions reversed from the aforementioned ones occur to drive the mover 31 in the direction opposed to that of the arrow X. The mover 31 is reciprocally moved by causing switching of the direction and magnitude of the electric current alternately.

The magnets 35A and 35B are fixed on the outer circumference of the moving iron core 34, as compared with the conventional linear motor with moving magnet. Therefore, the clearances in the magnetic flux loop are reduced because of the absence of the clearance between the magnets 35A and 35B and the moving iron core 34. As a result, the magnetic resistance is lowered to allow the magnetic fluxes to flow more easily than in the conventional linear motor. Therefore, the electric current to be fed to the magnet wires 26A and 26B for generating a predetermined magnetic flux for a necessary thrust can be reduced to improve the efficiency or to reduce the amount of magnetism.

Since the magnets 35A and 35B are adhered to the moving iron core 34, the mover 31 can have a strong structure and can easily improve the precision of the external diameter size. Moreover, the intensity of the magnets, as might otherwise be fragile, is compensated by themselves. As a result, the magnets made of the expensive rare earth element can be thinned to lower the cost drastically, and the moving portion is lightened to improve the efficiency.

Moreover, the mover 31 is supported by the planar springs 42A and 42B with respect to the stator 25, and these planar springs 42A and 42B have a higher radial rigidity than the spring constant in the axial direction. Therefore, even if an imbalance or the like in the load of the weight of the mover 31 or in the magnetic attraction acts between the mover 31 and the stator 25, the change in the clearance between the mover 31 and the stator 25 is remarkably small. It is, therefore, possible to prevent the mover 31 from being deformed to cause the noises and from colliding against the stator 25.

The planar springs 42A and 42B have the relatively longer arm portions, as compared with the radius, because the arm portions 42F and 42G extend while turning in the same direction. Therefore, the rocking amplitude within the elastic range is so large as to relax the increase in the stresses of the springs.

Moreover, both the planar springs 42A and 42B are so attached as to turn counter-clockwise, as viewed from the side of the planar spring 42A of FIG. 3. Moreover, the arm portions 42F and 42G have the identical turning direction. As a consequence, the turning directions, which are caused by the fine torsion of the two springs accompanying the reciprocation are also identical. Therefore, it is possible to prevent the increase in the stress, which might otherwise be caused when the torsion is restricted by the slight turn of the mover 31 of the cylindrical shape, to thereby improve the reliability.

When the mover 31 is to be fixed relative to the stator 25 through the planar springs 42A and 42B, an even clearance has to be retained by inserting a plurality of clearance gauges of thin sheet shapes having small width between the mover 31 and the stator 25. When the planar springs 42A and 42B are arranged on the two end faces of the linear motor 43, however, the clearance between the mover 31 and the stator 25 is hidden behind the planar springs 42A and 42B. As a consequence, the exposed clearance is reduced, as shown in FIG. 2. In this embodiment, however, the planar springs 42A and 42B are arranged at the attaching angles of 90 degrees on the two sides of the mover 31. As a consequence, the clearance gauges can be inserted all over the circumference by inserting them from the two sides of the motor. Therefore, the even clearance can be retained by connecting the mover 31 and the stator 25 through the planar springs 42A and 42B after the clearance gauges were inserted. As a result, the wrenching force, which might otherwise be generated due to the unbalance of the magnetic attractions, can be prevented so as to reduce the generation of the sliding loss and to prevent the wear.

The stationary iron core 27 is divided into three blocks in the axial direction across the section containing the housing portions of the magnet wires 26A and 26B. Therefore, the assembly can be made by inserting the magnet wires 26A and 26B wound in advance in the ring shape, in a clamping manner, to thereby achieve a high production efficiency.

In this embodiment, the stator 25 has the three magnet poles, and the mover 31 has the two magnets arranged in the axial direction. However, the motor can also be constructed even if the stator has two magnet poles or four or more magnet poles. In short, it is sufficient that the stator is provided with a plurality of magnet poles and that the mover is provided with magnets of a number less by one than the number of magnet poles of the stator.

The flows of the magnetic fluxes in the stationary iron core 27 turns their directions by about 90 degrees between the magnet poles 29A, 29B and 29C and the outer circumference side of the magnet wires 26A and 26B. However, the stationary iron core 27 is made of the non-oriented electromagnetic steel strip. So, the permeability has no orientation no matter what direction the magnetic fluxes might flow in. Therefore, no serious efficiency drop occurs.

Exemplary Embodiment 2

Figure 6:
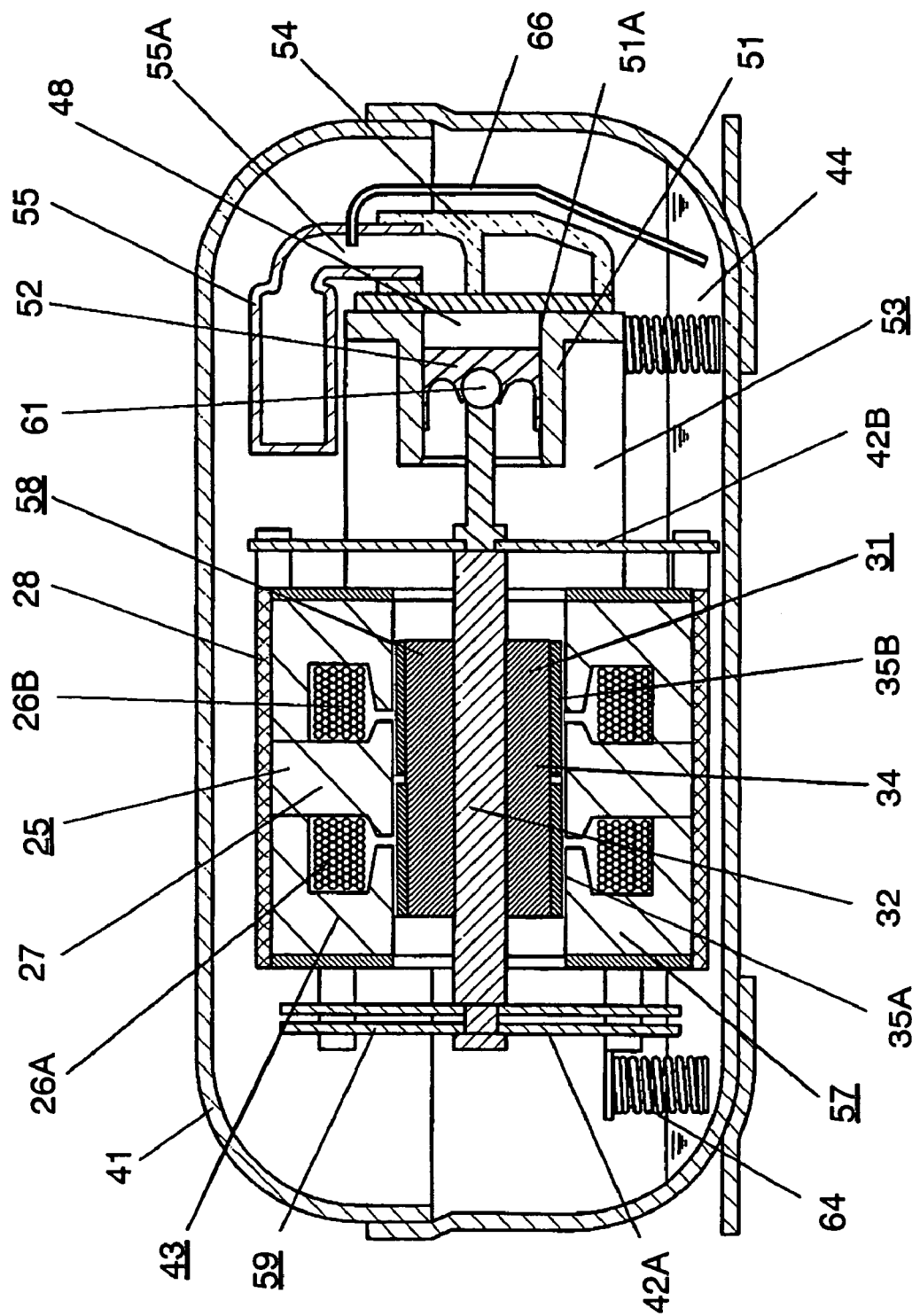
FIG. 6 is a sectional side elevation of a linear compressor according to a second exemplary embodiment of the present invention.
Figure 7:
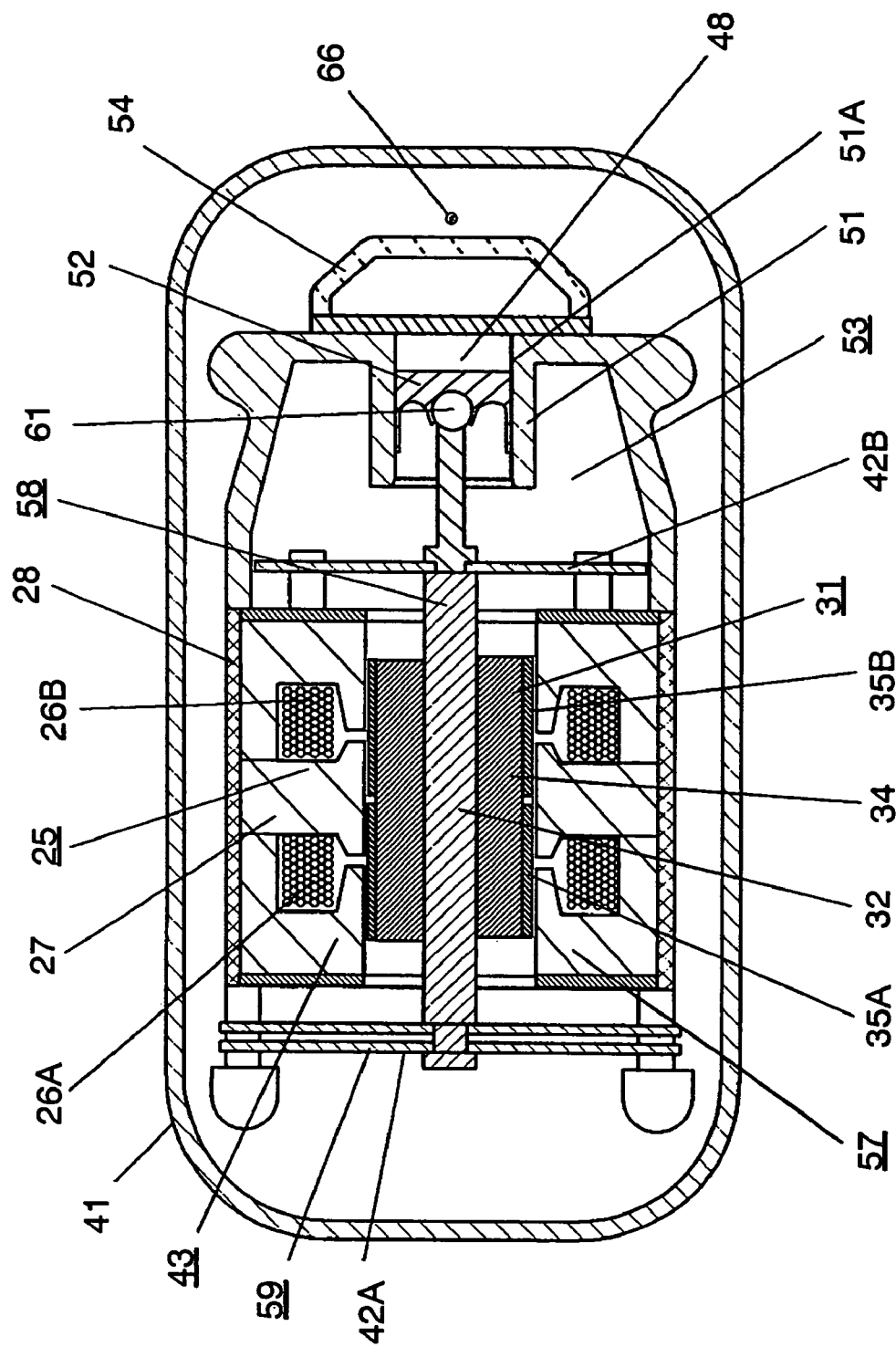
FIG. 7 is a horizontal section of FIG. 6.

FIG. 6 is a sectional side elevation of a linear compressor according to the second exemplary embodiment of the present invention, and FIG. 7 is a horizontal section of FIG. 6. A closed casing (as will be called the "case") 41 houses a compressor body 53 having the linear motor 43.

In a cylinder 51 connected to the stator 25 of the linear motor 43, there is reciprocally inserted a piston 52, which is connected to the mover 31 of the linear motor 43. To the end face of the cylinder 51, there are attached a cylinder head 54 and a suction muffler 55. The cylinder head 54, the suction muffler 55, the cylinder 51, the stator 25 and so on form a stationary unit 57.

A moving unit 58 is composed of the piston 52, the mover 31 and so on. The piston 52 is attached to the distal end of the shaft 32 of the mover 31, and the shaft 32 and the piston 52 are rotatably connected to each other through a ball joint 61. The planar springs 42A and 42B are individually attached at their center portions to the moving unit 58 and at their two distal end portions to the stationary unit 57 to thereby form a resonance spring 59. The cylinder 51 is attached to the frame 28 of the stator 25 of the linear motor 43, and the piston 52 is inserted in a rocking manner into the inner face 51A of the tube-like cylinder 51.

The compressor body 53 is so elastically supported by suspension springs 64 that the linear motor 43 may reciprocate substantially horizontally in the case 41. A capillary tube 66 is dipped at its one end in lubricating oil 44 contained in the bottom portion of the case 41, and opens at its other end into a tube portion 55A of the suction muffler 55.

Here will be described the actions of the linear compressor thus constructed. When the linear motor 43 is fed with the electric current, the mover 31 reciprocates so that the piston 52 attached thereto reciprocates in the cylinder 51 to act as the compressor. At this time, the frequency of the electric current is set in the vicinity of the resonance frequency, which is determined by the mass of the stationary unit 57 and the moving unit 58 and the spring constant of the resonance spring 59 so that the linear motor 43 reciprocates efficiently with little energy loss by the resonance actions.

When the coolant gas is sucked from the suction muffler 55 into a compression chamber 48, the lubricating oil 44 is fed from the capillary tube 66 to lubricate the sliding portions between the piston 52 and the cylinder 51. The load to act between the mover 31 and the stator 25 is supported by the planar springs 42A and 42B so that the sideway force hardly acts on the sliding portions between the piston 52 and the cylinder 51. On the other hand, the piston 52 and the mover 31 are connected through the ball joint 61. Even with a small deviation between the rocking directions of the linear motor 43 and the axis of the cylinder 51 due to the influence of precision of parts size or assembly, therefore, the ball joint 61 rotates to prevent the wrench between the piston 52 and the cylinder 51. It is, therefore, possible to prevent the drop in the efficiency, as might otherwise be caused by the increase in the sliding loss, and the drop in the reliability, as might otherwise be caused by the friction.

In the linear compressor according to this embodiment, the cylinder 51, the planar spring 42B, the motor 43 and the planar spring 42A are arranged in tandem in the axial direction and in the recited order. In short, the linear compressor is constructed to have the generally horizontal rocking direction of the mover 31. Therefore, the diameter can be made smaller than that of the conventional linear compressor, in which the cylinder is arranged in the motor. By arranging that linear compressor to have a horizontal axis, the overall height can be made smaller than that of the conventional compressor. As a result, the volume of the mechanical chamber for housing the compressor is reduced when the compressor is mounted in a refrigerator, so that the capacity of the refrigerator is enlarged.

Moreover, the moving unit 58 is reliably supported by the planar springs 42A and 42B so that its weight does not act as the contact load of the cylinder 51 and the piston 52 even if the compressor is placed in a horizontally lying position. Therefore, it is possible to prevent the drop in the efficiency, as might otherwise be caused by the increase in the sliding loss, and the drop in the reliability, as might otherwise be caused by the friction.

Exemplary Embodiment 3

Figure 8:
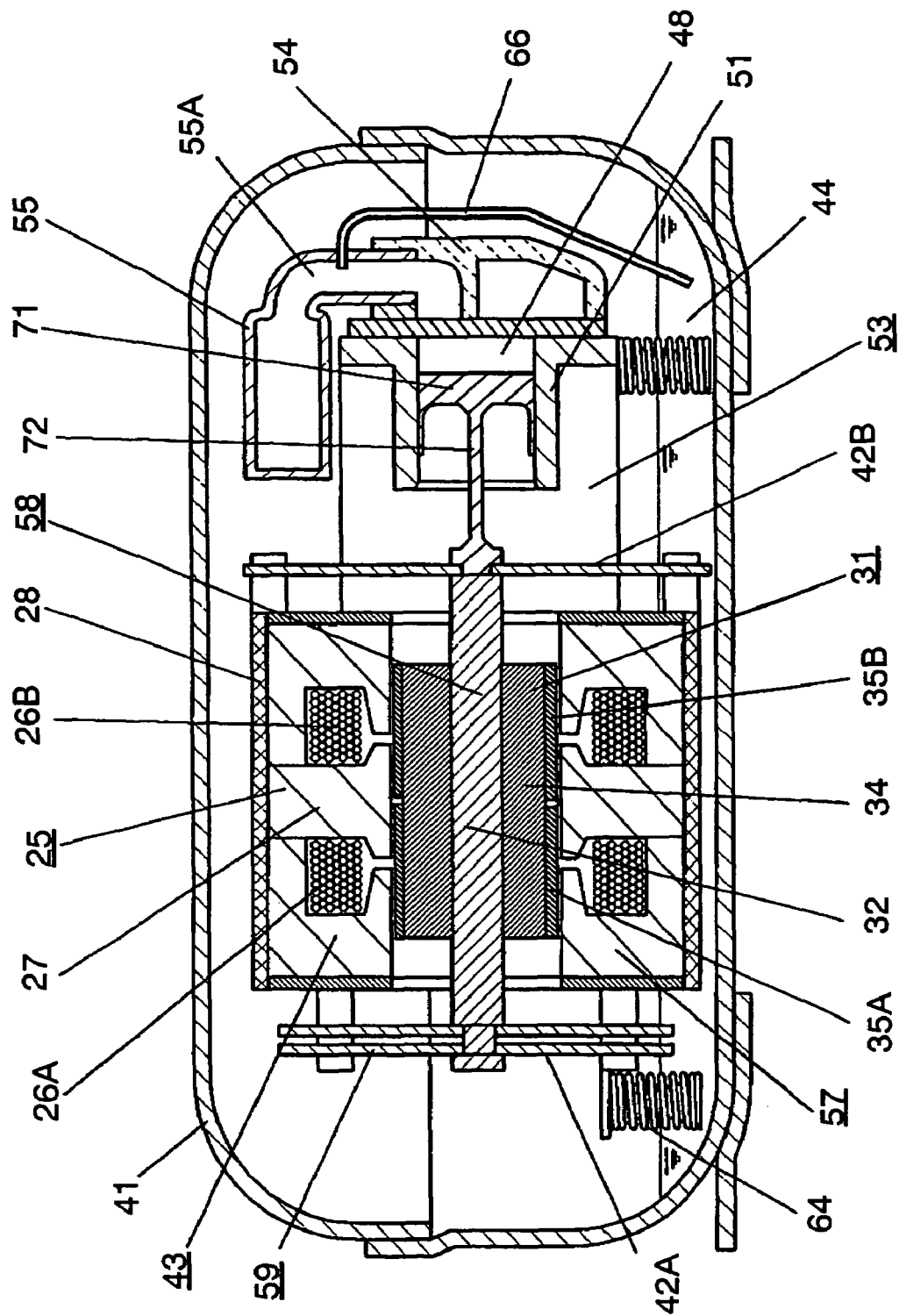
FIG. 8 is a sectional side elevation of a linear compressor according to a third exemplary embodiment of the present invention.

FIG. 8 is a sectional view of a linear compressor according to the third exemplary embodiment 3 of the present invention. A piston 71 and the mover 31 are connected to each other through a compliance rod (as will be called the "rod") 72. The remaining constructions are similar to those of the second embodiment.

The rod 72 is constructed of such a radially small rod-shaped elastic member as has transverse flexibility and elasticity while retaining a rigidity for supporting the load in the axial direction. Specifically, the rod 72 is made of a metallic material having an elasticity and a rigidity, such as stainless steel or spring steel. Namely, the rod 72 can move in parallel with the axis of the piston 71 and is flexible in the rotating direction. Even with a small deviation between the shaft 32 of the mover 31 and the axis of the cylinder 51, therefore, the wrench between the piston 71 and the cylinder 51 is prevented so as to prevent the friction and the wear.

Exemplary Embodiment 4

Figure 9:
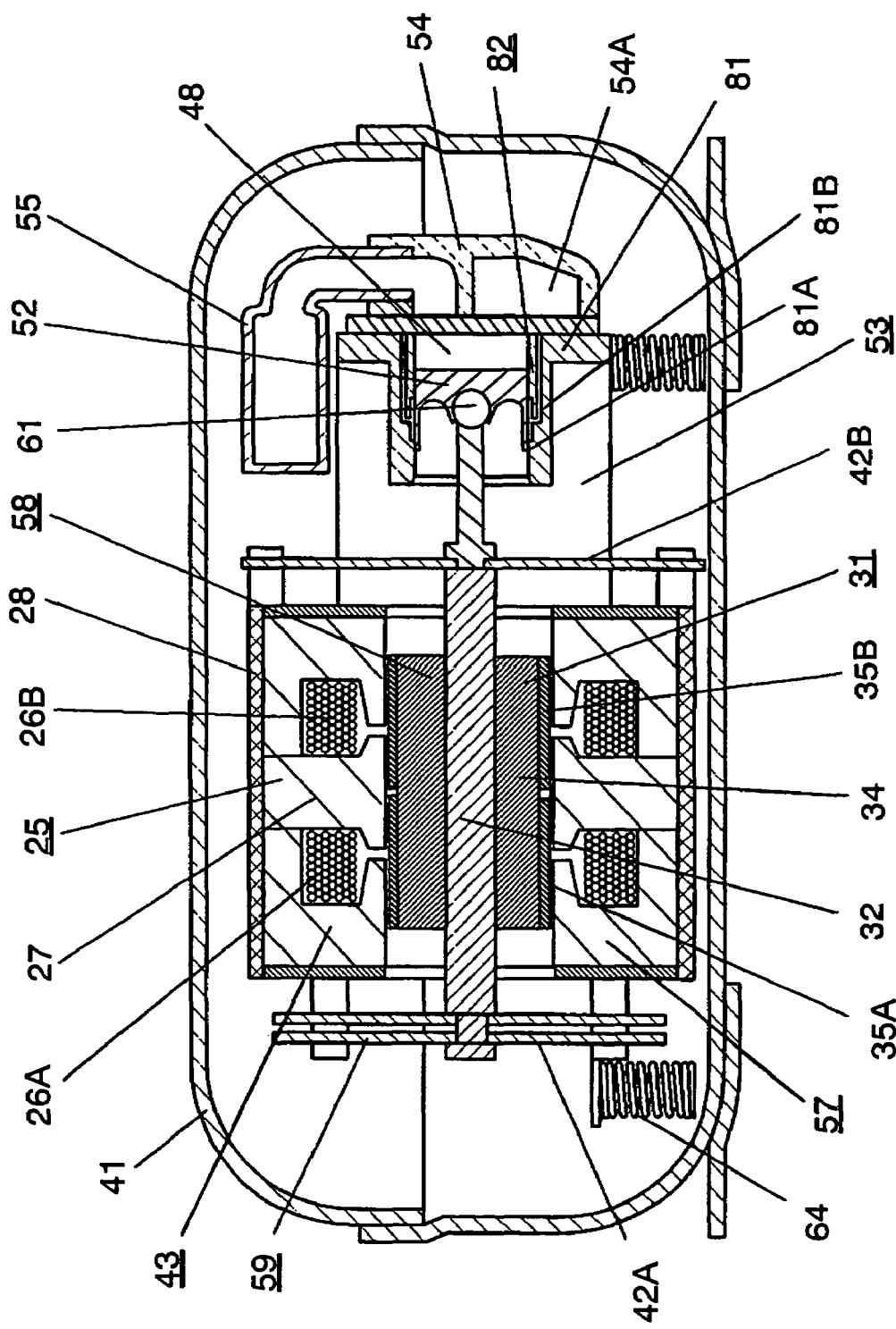
FIG. 9 is a sectional side elevation of a linear compressor according to a fourth exemplary embodiment of the present invention.

FIG. 9 is a sectional view of a linear compressor according to the fourth exemplary embodiment of the present invention. A cylinder 81 is provided with a gas passage 81B, which communicates with a high-pressure chamber 54A of the cylinder head 54 at the position of an internal face 81A confronting the piston 52, to thereby form a gas bearing 82. Moreover, in this embodiment the lubricating oil 44 and the capillary tube 66 are not provided, because the lubricating oil in not necessary. The remaining constructions are similar to those of the second embodiment, as shown in FIG. 6.

In the gas bearing 82, the piston 52 is held in a floating state with respect to the cylinder 81 by the high-pressure coolant gas fed from the high-pressure chamber 54A of the cylinder head 54. Generally, a gas bearing has a remarkably low friction because it prevents the contact between the solids. In order to bear a heavy load, however, it is necessary to feed a large amount of gas, and a gas leakage causes a loss when the gas bearing is used between the piston 52 and the cylinder 81 of the compressor. In this embodiment, the mover 31 is supported by the planar springs 42A and 42B so that only a low load acts on the gas bearing 82. This makes it sufficient to feed a small amount of gas to the gas bearing 82. Moreover, the ball joint 61 prevents the inclinations of the piston 52 and the cylinder 81. This reduces both the sliding loss and the leakage loss. As a result, the efficiency of the compressor is improved, and the reliability is prevented from being degraded by the friction.

Because of no use of the lubricating oil, the heat transfer face of the heat exchanger of a cooling system is not wetted with the lubricating oil so that the heat transfer with the coolant is improved to improve the efficiency of the cooling system. Accordingly as the coolant is not dissolved in the lubricating oil, the amount of the coolant to be used in the cooling system can be reduced not only to lower the cost but also to improve the efficiency of the heat exchange in the cooling system and accordingly the efficiency of the cooling system as a whole. In the case of using a natural coolant or a combustible coolant, moreover, the amount of coolant to be used can be reduced to lower the inflammability and explosiveness of the coolant, if leaked, to thereby improve the safety.

Exemplary Embodiment 5

Figure 10:
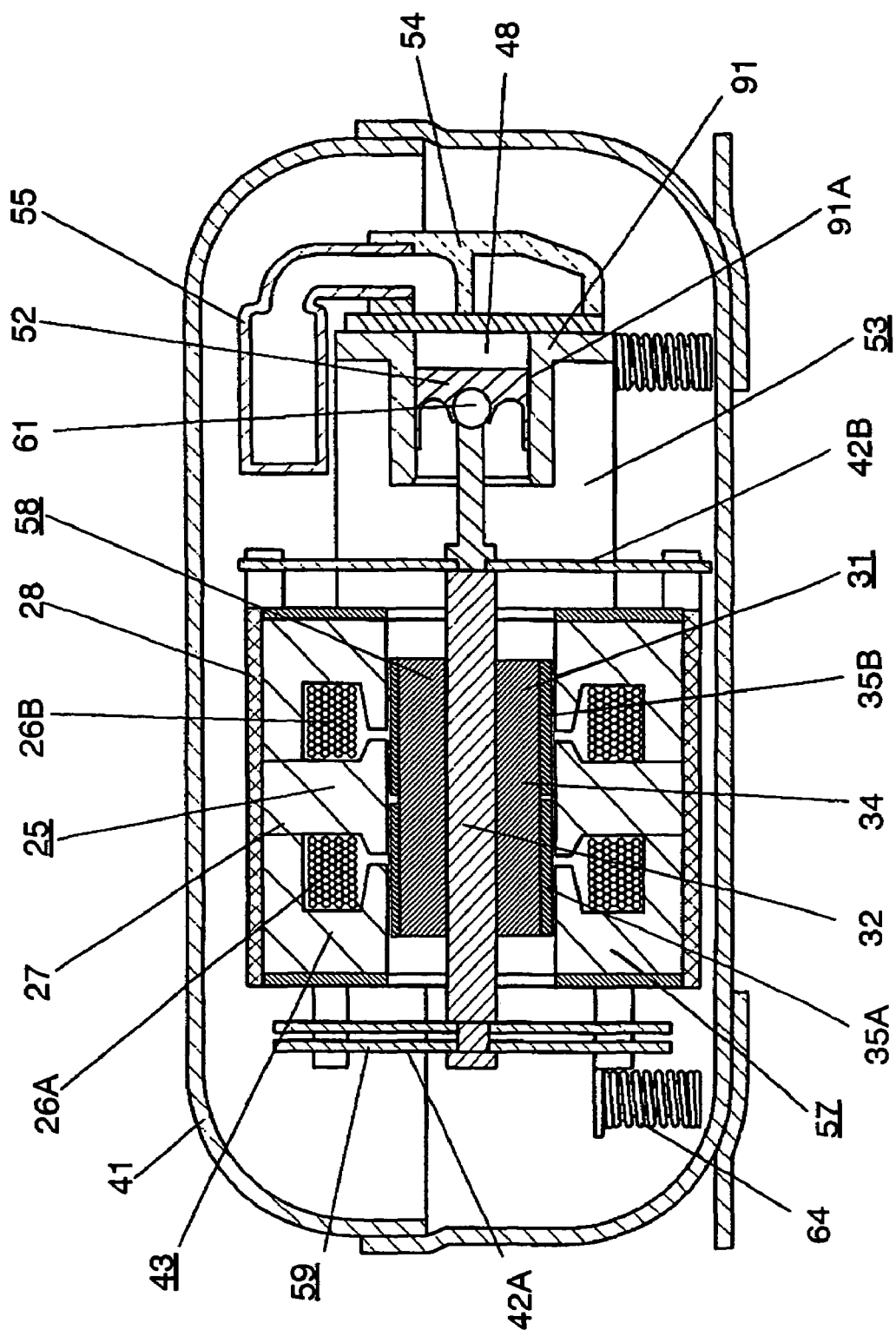
FIG. 10 is a sectional side elevation of a linear compressor according to a fifth exemplary embodiment of the present invention.

FIG. 10 is a sectional view of a linear compressor according to the fifth exemplary embodiment of the present invention. A cylinder 91 is made of a self-lubricating material. Specifically, a diamond-like carbon film is applied to the sliding face. In this embodiment, the gas bearing 82 is not provided. The remaining constructions are similar to those of the fourth embodiment of FIG. 9.

The sliding portions of the piston 52 and the cylinder 91 bear a low load. Moreover, the surface 91A of the cylinder 91 has the self-lubricating property so that the wear is prevented without the lubricating oil to thereby retain the reliability of the sliding portions. Thus, this embodiment can achieve effects similar to those of the fourth embodiment.

In this embodiment, the diamond-like carbon film is used on the cylinder 91, but similar effects can be achieved even if another material such as a material having a self-lubricating property, e.g., carbon added thereto, or a material, e.g., polytetrafluoroethylene is used.

In this embodiment, the self-lubricating material is used in the cylinder 91, but similar effects can also be achieved even if that material is used in the piston 52.

Exemplary Embodiment 6

Figure 11:
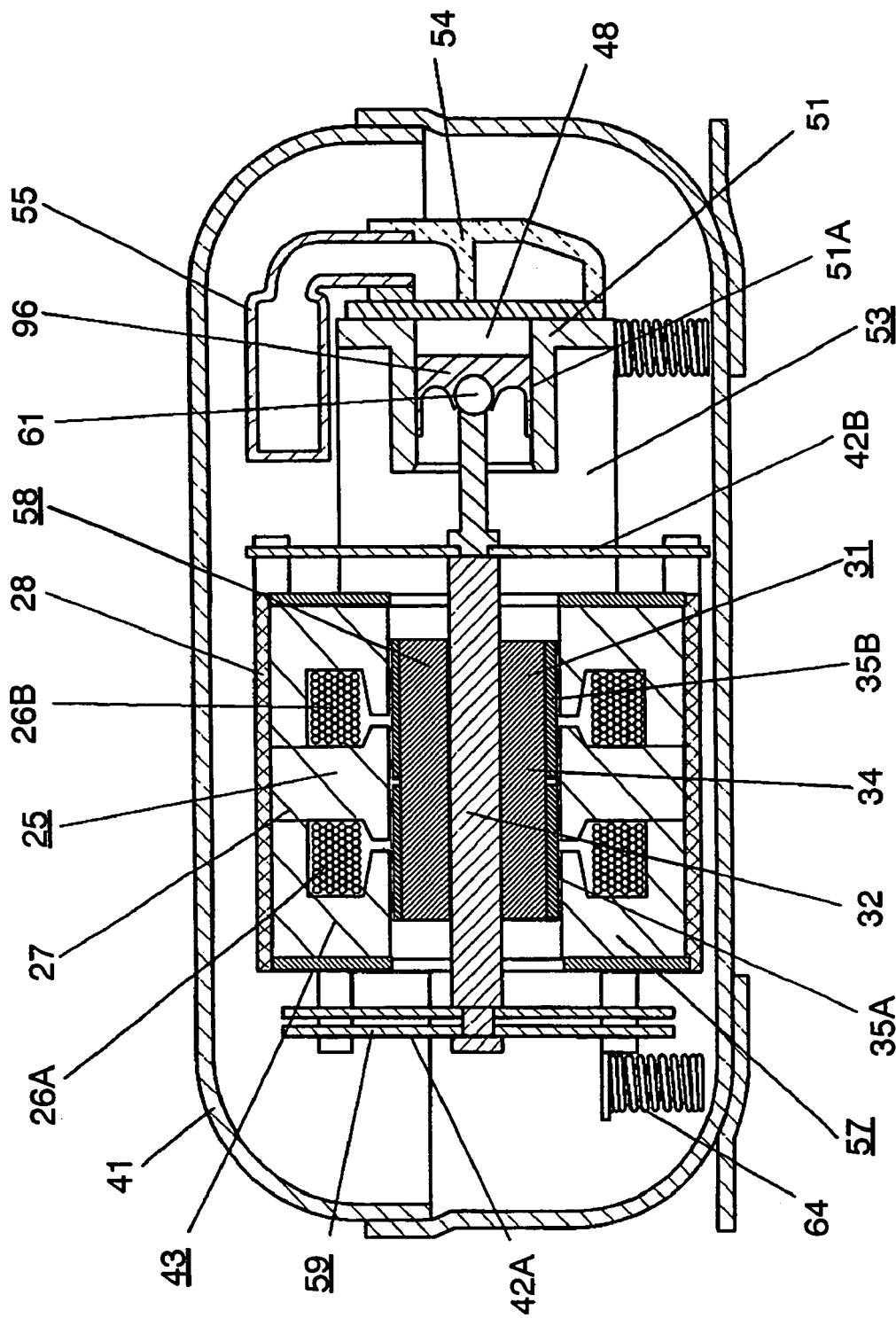
FIG. 11 is a sectional side elevation of a linear compressor according to a sixth exemplary embodiment of the present invention.

FIG. 11 is a sectional view of a linear compressor according to the sixth exemplary embodiment of the present invention. A piston 96 is made of a ceramic material and is specifically coated on its surface with a film of tungsten carbide. The remaining constructions are similar to those of the fifth embodiment of FIG. 10.

The piston 96 is provided on its surface with a tungsten carbide film having a high wear resistance so that it is prevented from being worn even without the lubricating oil, to thereby retain the reliability of the sliding portions. Moreover, effects similar to those of the fifth embodiment such as the reduction in the viscous friction is achieved because the lubricating oil is not used.

In this embodiment, the tungsten carbide is used as the ceramic material, which may be replaced by a ceramic material such as zirconia for the improved reliability.

Similar effects can be achieved even if the ceramic material is used not in the piston 96 but in the cylinder 51.

Exemplary Embodiment 7

Figure 12:
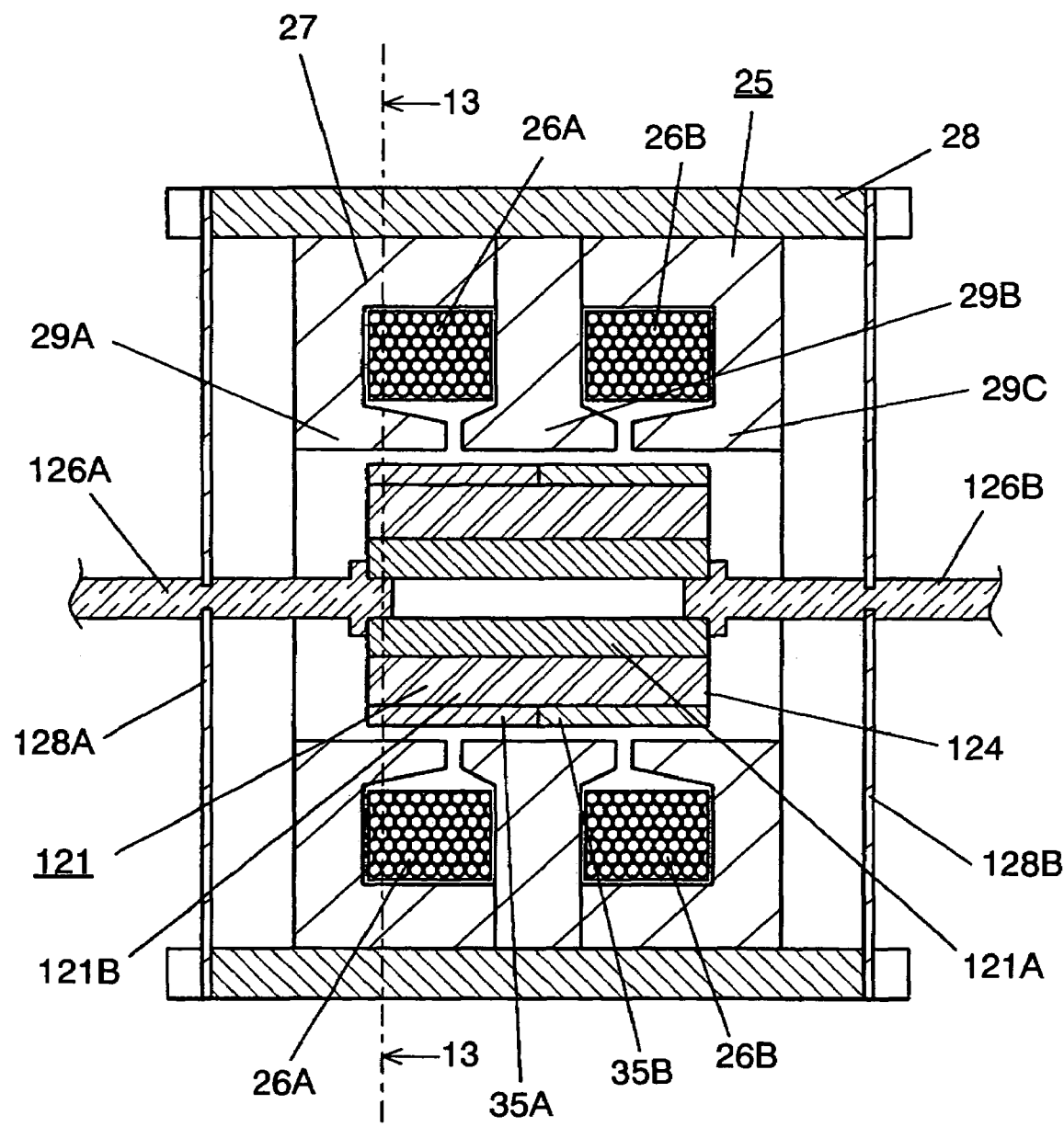
FIG. 12 is a sectional side elevation of a linear motor according to a seventh exemplary embodiment of the present invention.
Figure 13:
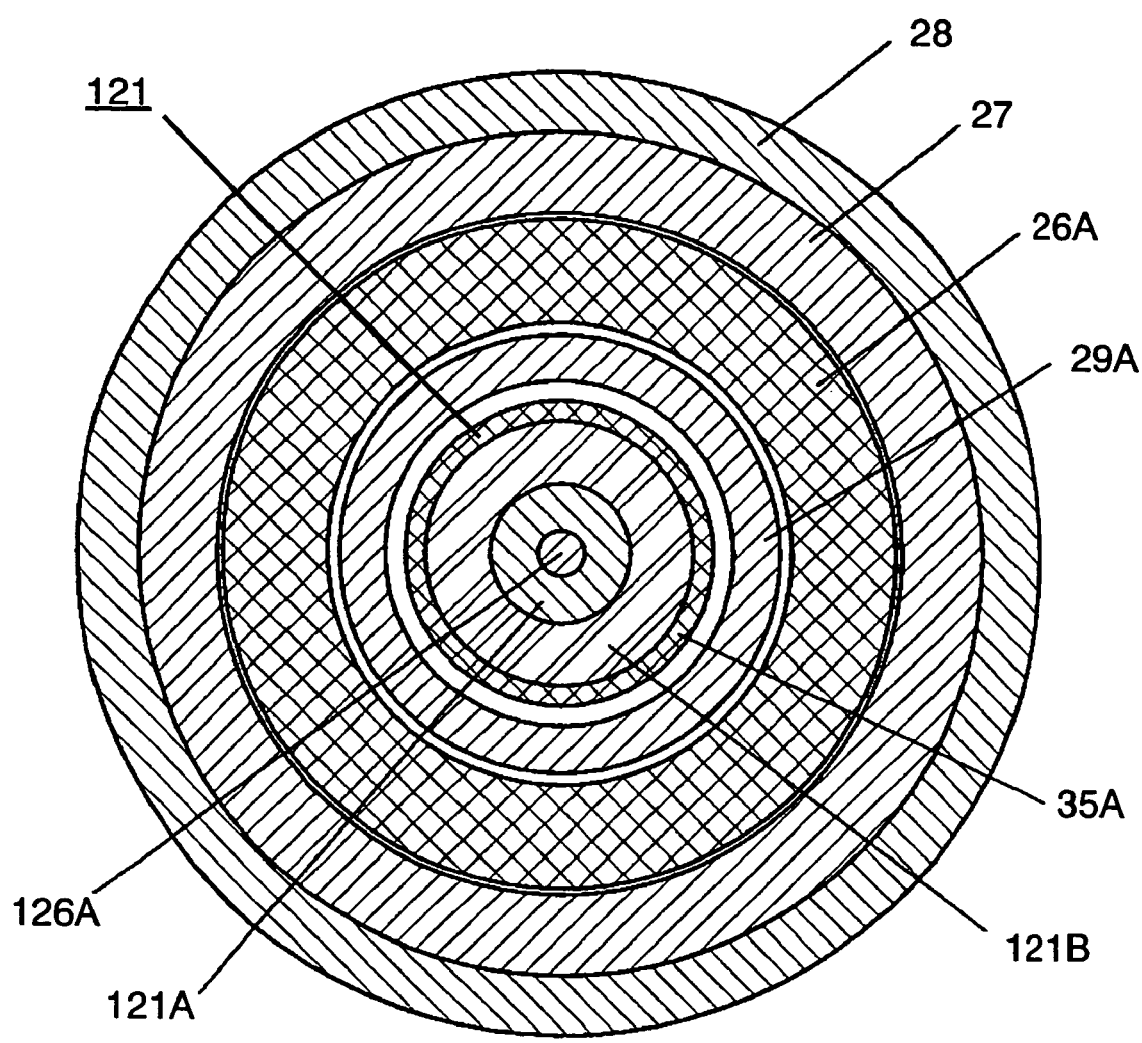
FIG. 13 is a sectional view taken along line A—A of FIG. 12.
Figure 14:
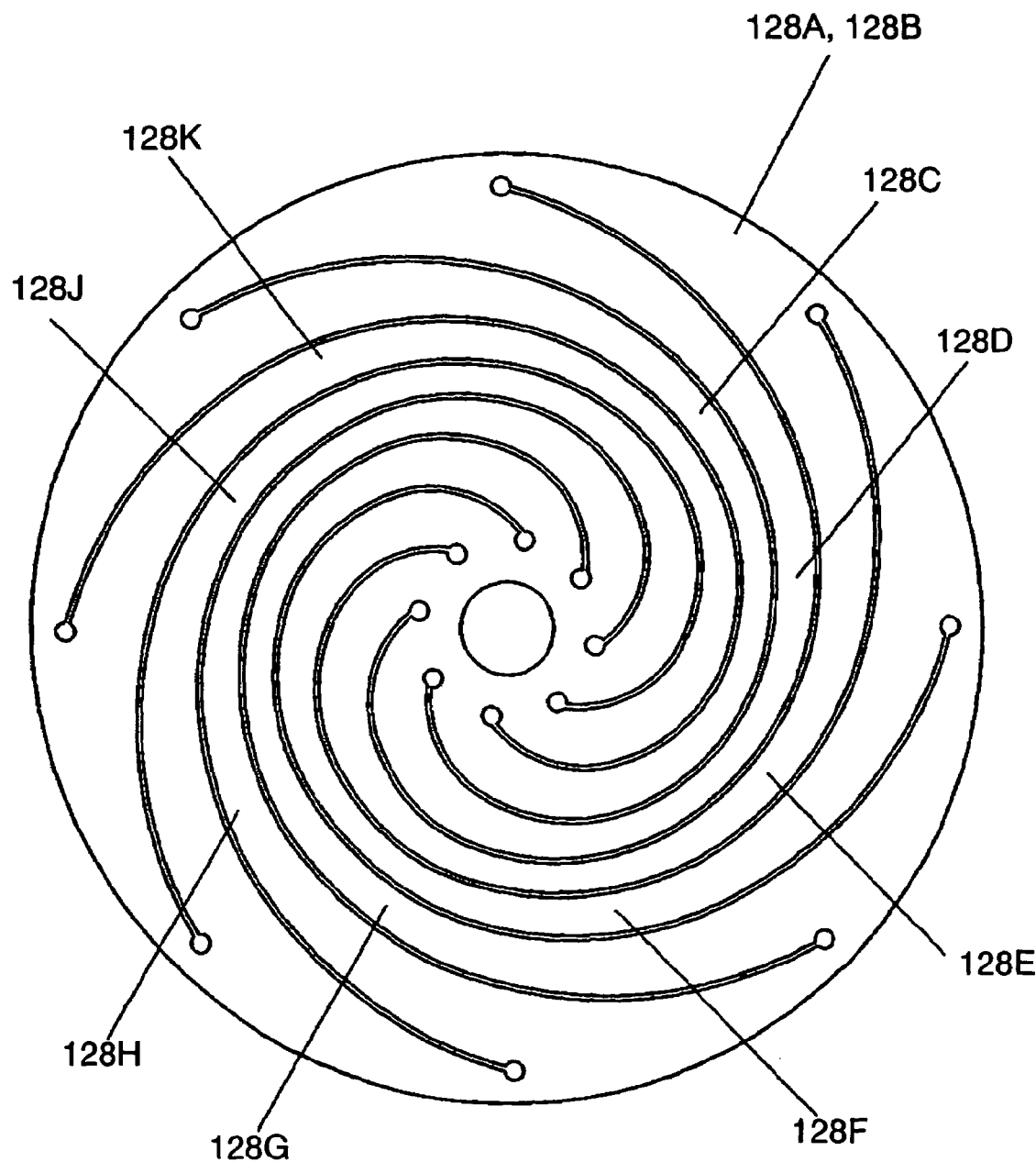
FIG. 14 is a plan view of a flexure bearing to be used in the linear motor according to the seventh exemplary embodiment of the present invention.

FIG. 12 is a sectional side elevation of a linear motor according to the seventh exemplary embodiment of the present invention. FIG. 13 is a sectional view taken along line A—A of FIG. 12, and FIG. 14 is a plan view of a flexure bearing. A mover 121 of this embodiment includes a moving iron core 124 having a core portion 121A and a sheet portion 121B formed integrally with each other, and moving shafts 126A and 126B fixed in the core portion 121A and extended in the rocking directions. Flexure bearings 128A and 128B, which are individually arranged on the two sides of the rocking directions of the mover 121, hold the moving shafts 126A and 126B and support the mover 121 in a manner to rock in the rocking directions. The remaining constructions are similar to those of the first embodiment. Here, this embodiment is not provided with the end faces 36, which have been described with reference to FIG. 1, but may be provided with the end plates 36 as in the first embodiment.

The core portion 121A is formed of a ferrous material into a hollow cylinder shape. The sheet portion 121B is formed by arraying silicon steel sheets on the outer periphery of the core portion 121A radially with respect to the axis of the mover 121. The silicon steel sheets are highly permeable and are represented by a non-oriented electromagnetic steel strip of JIS C2552, for example. Both the moving shafts 126A and 126B are made of a nonmagnetic material such as stainless steel, which has a sufficiently higher electric resistance than that of iron.

Each of the flexure bearings 128A and 128B is provided with eight arms 128C, 128D, 128E, 128F, 128G, 128H, 128J and 128K, which are formed by cutting eight thin slits in the plate-shaped elastic material.

The flexure bearings 128A and 128B are individually connected and fixed to the frame 28 at their outer circumference and to the moving shaft 126A or 126B at their inner circumference. The flexure bearings 128A and 128B constitute elastic members. These flexure bearings 128A and 128B have extremely high rigidities in the radial direction but extremely lower rigidities as the elastic members in the axial directions (or in the rocking directions) than those in the radial directions. Therefore, the flexure bearings 128A and 128B function as bearings for supporting the mover 121 reciprocally in the axial directions. The radial and axial rigidities vary with the design factors such as the shape, array, material and material thickness of the arms. The flexure bearings 128A and 128B have such radial rigidities as can support the force for at least the mover 121 to be attracted to the stator 25 by the magnetic attractions and can allow the mover 121 and the stator 25 to maintain a predetermined clearance all over the circumference.

The magnets 35A and 35B and the magnet poles 29A, 29B and 29C are so arranged that the magnet 35A may confront the magnet poles 29A and 29B whereas the magnet 35B may confront the magnet poles 29B and 29C even when the mover 121 rocks. Moreover, the mover 121 is given such a length that it does not move out of the inside of the stator 25 during rocking, and that its difference from the length of the stator 25 is substantially equal to the maximum amplitude of the mover 121.

Here will be described the actions of the linear motor thus constructed. When the magnet wires 26A and 26B are fed with the electric current, the mover 121 is driven as in the case of the first embodiment of FIG. 4. When the direction of the electric current is reversed, the mover 121 is driven in the reverse direction. The mover 121 is reciprocated by causing switching of the direction and magnitude of the electric current alternately.

As in the first embodiment, the magnets 35A and 35B and the moving iron core 124 are also integrated in this embodiment. As a consequence, the clearance contained in the magnetic flux loop is reduced to lower the magnetic resistance. Therefore, the necessary magnetic force can be generated with little and small magnets to thereby reduce the loss in the support mechanism for supporting the wrenching force and the gravitational force perpendicular to the reciprocating directions of the mover 121.

Here, a fine turning torsion occurs in the flexure bearings 128A and 128B according to the reciprocation of the mover 121. This turning torsion is absorbed because the mover 121 and the stator 25 are formed into the generally cylindrical shape sharing the axis of the mover 121 in the rocking directions. As a consequence, the mover 121 maintains a predetermined spatial distance from the stator 25 even if it rotates. In other words, it is possible to prevent the problems in the reduction of the efficiency or the increase in the noises, which might otherwise be caused by contact or collision between the mover 121 and the stator 25.

Moreover, it is sufficient for the positional relation to align the axes of the mover 121 and the stator 25. In other words, the assembly for keeping the clearance constant is easier than the case, in which the mover 121 has a flat surface. As a result, the magnetic attractions by the magnets 35A and 35B to act between the mover 121 and the stator 25 are hardly deviated to establish little load in the radial directions.

Moreover, the loads in the radial directions are borne by the flexure bearings 128A and 128B so that the sliding loss accompanying the rocking motions of the mover 121 occurs less than that of the case of using a support mechanism such as slide bearings. And little load occurs in the sideways directions. This reduces such a rigidity in the radial directions of the flexure bearings 128A and 128B as is needed to support the mover 121. In other words, a low rigidity design can be performed by reducing the number and thickness of the flexure bearings 128A and 128B and the number of the arms. As a result, the hysteresis loss at the time when the flexure bearings 128A and 128B are deformed in the rocking directions can be minimized to provide a high efficiency. Here, this hysteresis loss is described by taking a spring as an example. The hysteresis loss is that which is caused when the energy stored in the spring by compressing the spring cannot be completely extracted as the repulsive force for the spring to extend.

Both the moving iron core 124 of the mover 121 and the stationary iron core 27 of the stator 25 are constructed of the sheets, which are arranged radially on the axial direction. Therefore, the extending direction of the sheets and the magnetic flux direction are so identical that the magnetic permeabilities are enhanced to suppress the induction current to be generated in the iron core, to thereby reduce the loss.

Additionally in this embodiment, the moving shafts 126A and 126B for supporting the mover 121, the frame 28 for supporting the outer circumference of the stator 25, and the flexure bearings 128A and 128B are made of a nonmagnetic material such as stainless steel. Therefore, it is possible to prevent the leakage of the magnetic fluxes, which bypass the moving shafts 126A and 126B from the stationary iron core 27 through the frame 28 and the flexure bearings 128A and 128B. As a result, the induction current by the leakage magnetic fluxes can be prevented to prevent the efficiency drop of the motor. Here, similar effects can also be achieved even if a nonmagnetic material such as a plastic other than the stainless steel is used for those portions.

The moving iron core 124 of the mover 121 is formed by arranging the sheets of the same width radially around the cylindrical core portion 121A, so that it can be easily formed into the cylindrical shape.

Since the core portion 121A of the mover 121 is made of a ferrous material, it acts as a portion of the magnetic path of the magnetic flux loop so that the efficiency can be improved while lightening the mover 121.

The vicinity of the center of the core portion 121A, which hardly contributes strength as a structural member and the magnetic flux loop as the magnetic path, is made hollow so that the mover 121 can be lightened.

Moreover, the maximum of the reciprocal distance of the mover 121 is approximately equal to the difference between the lengths of the mover 121 and the stator 25. As a result, it is possible to prevent the motor thrust from being lowered by the actions of the magnetic attractions for the magnets 35A and 35B of the mover 121 to go out of and into the stator 25.

The flexure bearings of this embodiment have the helical arms in the plate-shaped elastic member but may take another shape.

The construction of this embodiment is described as the linear motor but can also be applied, as it is, to a generator for converting the reciprocation into an electric current.

Moreover, the magnet wires 26A and 26B wound in the ring shape are connected in series but may also be connected in parallel.

Exemplary Embodiment 8

Figure 15:
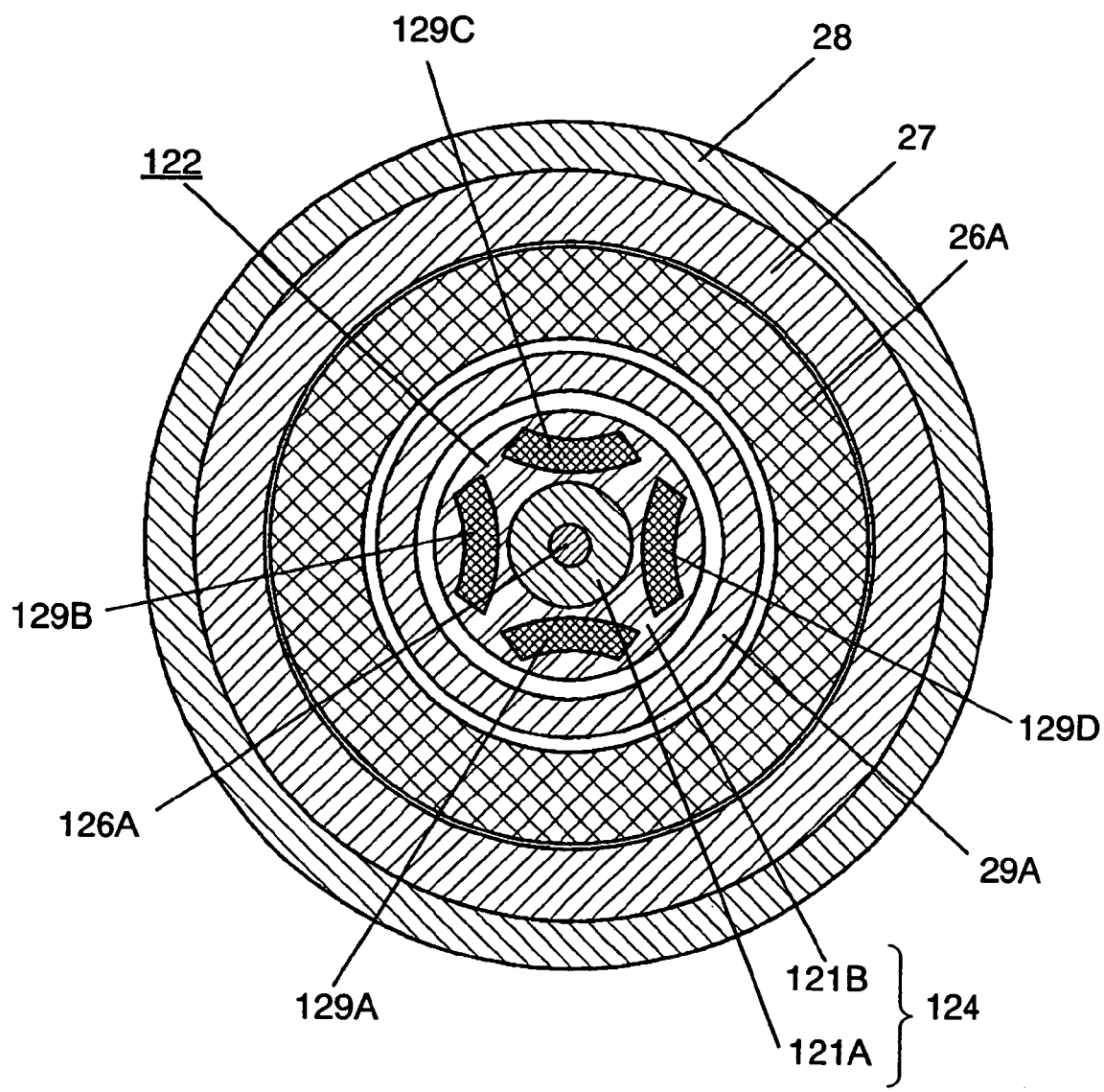
FIG. 15 is a sectional view of a linear motor according to an eighth exemplary embodiment of the present invention.

FIG. 15 is a sectional view of a linear motor according to the eighth exemplary embodiment of the present invention. Magnets 129A, 129B, 129C and 129D having a generally arcuate sectional shape are arranged in the moving iron core 124 and are integrated with the mover 122. The remaining constructions are identical to those of the seventh embodiment.

This embodiment achieves effects similar to those of the seventh embodiment 7. Moreover, the magnets 129A, 129B, 129C and 129D are not exposed to the surface of the mover 122, so that they have small attractions with the magnetic material. Therefore, the handling can be facilitated by simplifying the assembly with the magnetic material to thereby improve the mass productivity or the unit productivity drastically. This construction may also be combined with the first embodiment.

Exemplary Embodiment 9

Figure 16:
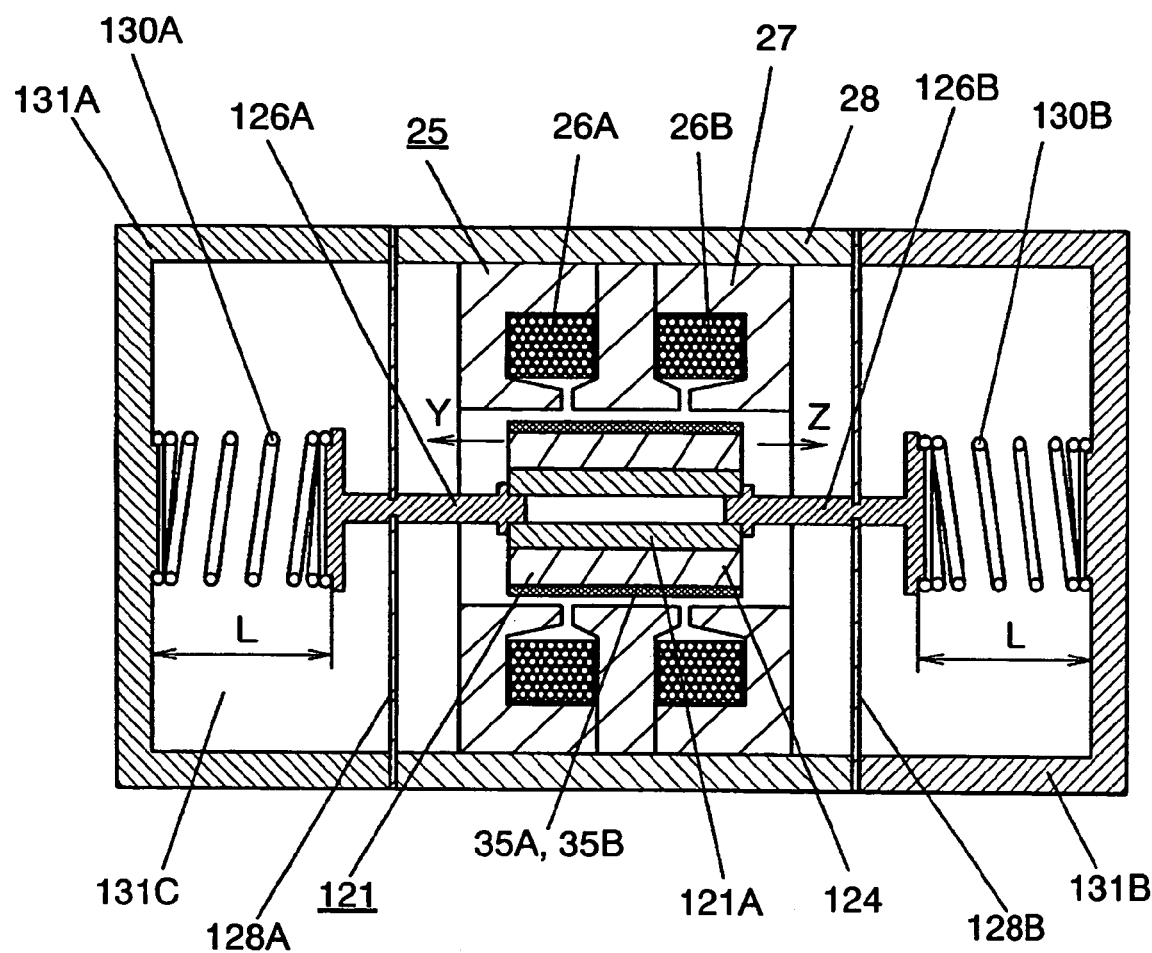
FIG. 16 is a sectional view of a linear motor according to a ninth exemplary embodiment of the present invention.

FIG. 16 is a sectional view of a linear motor according to the ninth exemplary embodiment of the present invention.

Coil springs (as will be called the "springs") 130A and 130B are respectively retained at their inside ends by the moving shafts 126A and 126B connected to the mover 121 and at their outer ends by spring holders (as will be called the "holders") 131A and 131B fixed on the frame 28. The springs 130A and 130B have a smaller length (L) at the assembling time than a natural length (H) and the compression size (H-L) is large—at least one half of the rocking distance of the mover 121, i.e., a stroke (S). In short, the mover 121 is pushed from its two sides by the springs 130A and 130B.

The springs 130A and 130B determine the resonance frequency, as the total spring constant with the flexure bearings 128A and 128B. It is determined in the mass relation to the mover 121.

All the components such as the reciprocating mover 121, the moving shafts 126A and 126B, the springs 130A and 130B, the stator 25 and so on are housed in the generally closed space (as will be called the "space") 131C, which is defined by the frame 28 and the holders 131A and 131B.

Here will be described the actions of the linear motor thus constructed.

When the ring-shaped magnetic wires 26A and 26B are fed with an AC current, the mover 121 is reciprocated on the same principle as that of the seventh embodiment. When the mover 121 moves in the direction of arrow Y, for example, the spring 130A flexes and stores a first repulsive force in the spring 130A. Next, when the flow direction of the electric current changes so that when the mover 121 moves in the direction of arrow Z, the first repulsive force is extracted from the spring 130A and is recovered as the velocity of the mover 121. Simultaneously with this, the spring 130B flexes in turn and stores a second repulsive force in the spring 130B. When the mover 121 moves again in the direction of arrow Y, the second repulsive force is extracted from the spring 130B and is recovered as the velocity of the mover 121.

This action is the so-called "resonance action", in which the reciprocation of a large stroke can be caused with a lower electric current than that in the case of which the springs 130A and 130B are not used. The frequency of the power source at this time is equalized to the resonance frequency, which is determined from the masses of the mover 121 and the stator 25 and by the spring constants of the flexure bearings 128A and 128B and the springs 130A and 130B. Then, the accelerations from the mover 121 and the springs 130A and 130B as resonance springs are synchronized in periods. As a result, the energy loss is suppressed to a low level so that the mover 121 reciprocates highly efficiently.

In order to raise the resonance frequency, it is necessary to reduce the weight of the mover 121 or to increase the spring constants of the springs 130A and 130B or the flexure bearings 128A and 128B. However, the design of the motor is limited in the reduction of the weight of the mover 121. Practically, therefore, it is frequently easy to enlarge the spring constants. If the spring constants of the flexure bearings 128A and 128B are enlarged, the hysteresis loss rises to lower the efficiency. This is caused specifically by increasing the thickness of the flexure bearings 128A and 128B or by overlaying the flexure bearings 128A and 128B. On the other hand, the springs 130A and 130B basically have no hysteresis loss. In the design for raising the resonance frequency by enlarging only the spring constants of the springs 130A and 130B, therefore, the hysteresis loss can be reduced to retain a high efficiency.

The springs 130A and 130B have the smaller length (L) at the assembling time than the natural length (H) and the compression size (H-L) is large—at least one half of the rocking distance of the mover 121, i.e., the stroke (S). Even when the mover 121 moves to the maximum in the direction of arrow Y, therefore, the length (Lb) of the spring 130B is shorter than the natural length (H). In short, the spring 130B is always compressed from the natural length (H). Likewise, even when the mover 121 moves to the maximum distance in the direction of arrow Z, the length (La) of the spring 130A is shorter than the natural length (H). In short, the spring 130A is always compressed from the natural length (H).

Even if the mover 121 reciprocates, therefore, the springs 130A and 130B are always compressed from the natural length. By the energy stored by that deformation, therefore, the springs 130A and 130B are retained while being warped between the moving shafts 126A and 126B and the holders 131A and 131B. As a result, the linear motor always repeats the highly efficient resonance motions. Moreover, the springs 130A and 130B do not come out even without using any special fixing portion.

Moreover, all the components including the reciprocating mover 121, the moving shafts 126A and 126B, the springs 130A and 130B, the stator 25 and so on are housed in the space 131C. Therefore, the noises accompanying the motions of the mover 121, the moving shafts 126A and 126B and the springs 130A and 130B are confined in the space 131C. In other words, the noises are less transmitted to the outside to thereby achieve a noise insulating effect.

Both the moving iron core 124 of the mover 121 and the stationary iron core 27 of the stator 25 are constructed of the sheets, which are arranged radially on the axial direction. Therefore, noises may be generated from the vibrating sheets when the components vibrate, but are insulated.

In this embodiment, the springs 130A and 130B have the same spring constants, but the embodiment can be likewise made even if coil springs of different spring constants or sizes are combined. The resonance springs may also be constructed by combining the linear motor using the planar springs according to the first embodiment and the coil springs in this embodiment.

Exemplary Embodiment 10

Figure 17:
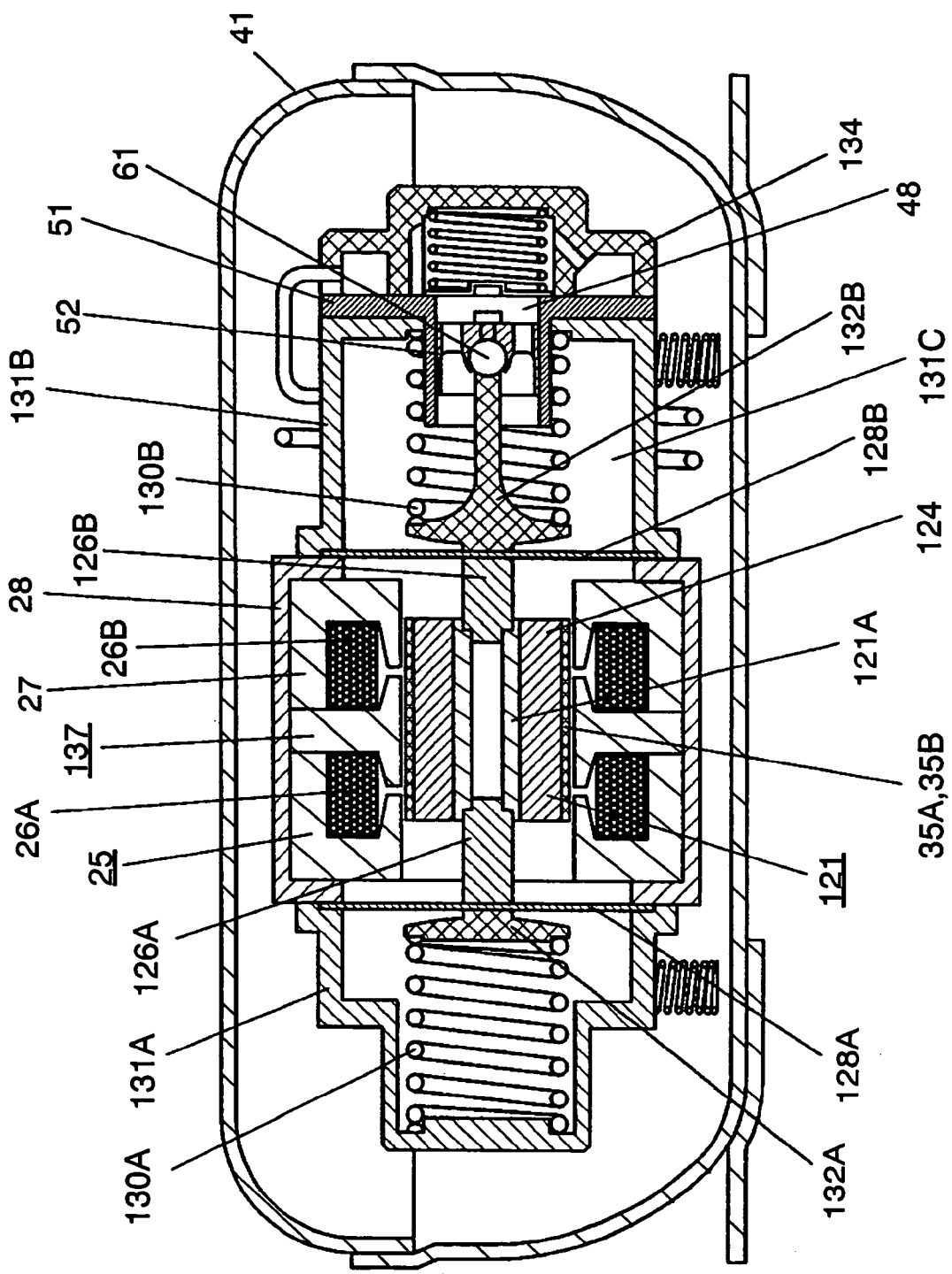
FIG. 17 is a sectional view of a linear compressor according to a tenth exemplary embodiment of the present invention.

FIG. 17 is a sectional view of a linear compressor according to the tenth exemplary embodiment of the present invention. The flexure bearings 128A and 128B are clamped and fixed at their outer circumferences between the spring holders (as will be called the "holders") 131A and 131B and the frame 28 supporting the stator 25. On the other hand, the inner circumferences of the flexure bearings 128A and 128B are retained by the moving shafts 126A and 126B connected to the mover 121 and by spring adapters (as will be called the "adapters") 132A and 132B.

The coil springs (as will be called the "springs") 130A and 130B are arranged on the sides of the two end faces across a linear motor 137 composed of the mover 121 and the stator 25. Moreover, the springs 130A and 130B are retained in a flexed state between the adapters 132A and 132B and the holders 131A and 131B, but do not use any special fixing unit. Here, the abutting faces of the adapters 132A and 132B and the holders 131A and 131B against the interposed springs 130A and 130B are provided with shallow steps for retaining the springs 130A and 130B.

The cylinder 51 is fixed on the holder 131B, and a cylinder cover 134 is fixed on the cylinder 51. The adapter 132B is connected to the piston 52 through the ball joint 61. The piston 52 can be freely inclined and turned relative to the spring adapter 132B. The compression chamber 48 is defined by the piston 52 and the cylinder 51.

Here will be described the actions of the linear compressor thus constructed.

When the magnet wires 26A and 26B of the linear motor 137 are fed with the AC current, the mover 121 reciprocates relative to the stator 25. This driving force is transmitted through the moving shaft 126B, the adapter 132B and the ball joint 61 to the piston 52 so that the piston 52 reciprocates integrally with the mover 121. By this reciprocation of the piston 52, the coolant gas sucked into the compression chamber 48 is sequentially compressed and discharged to the outside refrigerating cycle.

At this time, it is preferred that the frequency of the power source to be fed to the linear motor 137 be equalized to the resonance frequency, which is determined from the masses of the mover 121 and the stator 25 and from the spring constants of the springs 130A and 130B and the flexure bearings 128A and 128B, as described in the ninth embodiment. As a consequence, the periods of accelerations from the mover 121 and the springs 130A and 130B acting as the resonance springs are synchronized. As a result, the energy loss is suppressed to a low value so that the mover 121 reciprocates highly efficiently.

The flexure bearings 128A and 128B support the mover 121 on the two sides so that the sliding loss accompanying the rocking motions of the mover 121 does not occur unlike the case using a support mechanism such as the slide bearings. Moreover, the rigidity needed in the radial directions for the flexure bearings 128A and 128B is so low that the low rigidity design can be made by reducing the number or thickness of the flexure bearings or by reducing the number of arms. As a consequence, the hysteresis loss at the time when the flexure bearings 128A and 128B are deformed can be minimized to establish a high efficiency.

Moreover, the flexure bearings 128A and 128B wholly support the magnetic attractions to act in the radial directions of the mover 121 on the two sides. As a consequence, the magnetic attractions to occur between the mover 121 and the stator 25 do not act as the side pressures between the piston 52 and the cylinder 51 to thereby establish no sliding loss. These magnetic attractions are the forces to attract the mover 121 radially relative to the stator 25. Therefore, the sliding loss is reduced to make the compressor highly efficient and to improve the reliability of the sliding portion drastically. Even with the ball joint 61 being arranged between the adapter 132B and the piston 52, moreover, the piston 52 is supported, and the reciprocation of the mover 121 is transmitted to the piston 52. When the piston 52 reciprocates in the cylinder 51, therefore, the piston 52 is so inclined by the ball joint 61 as to rock with little axial inclination with respect to the sliding portion of the cylinder 51.

Even with the assembly, in which the mover 121 and the cylinder 51 have misaligned or inclined axes, the ball joint 61 absorbs the axial misalignment or inclination so that the piston 52 and the cylinder 51 may be aligned. Without any improvement in the parts or the parts assembling precision, therefore, the side pressure between the cylinder 51 and the piston 52 is reduced to reduce the sliding loss so that a highly efficient compressor is provided.

In this embodiment, the rocking directions of the mover 121 are oriented substantially horizontal. Like the second embodiment, therefore, the diameter is made smaller than that of the conventional linear compressor, in which the cylinder is arranged in the motor.

Exemplary Embodiment 11

Figure 18:
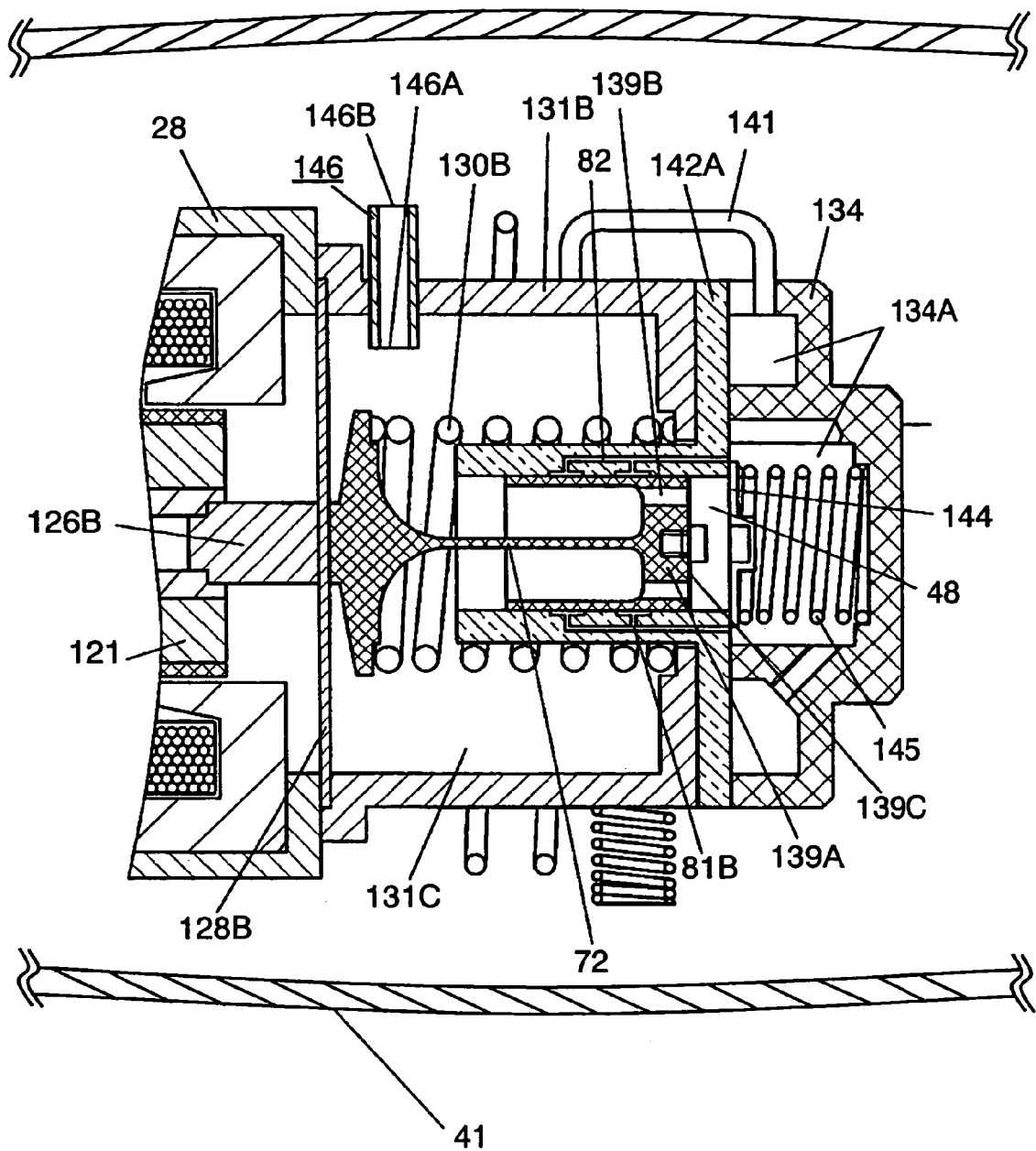
FIG. 18 is a sectional view of an essential portion of a linear compressor according to an eleventh exemplary embodiment of the present invention.

FIG. 18 is a sectional diagram of an essential portion of a linear compressor according to the eleventh exemplary embodiment of the present invention. This embodiment is so modified from the construction of the tenth embodiment that the compliance rod (as will be called the "rod") 72 described in the third embodiment is applied in place of the ball joint, and that the gas bearing 82 described in the fourth embodiment is applied.

From the viewpoint of the strength, the rod 72 is made of a material such as stainless steel or aluminum to have a relatively thin portion of a circular sectional shape. This thin portion allows the rod 72 to fall within the elastic deformation range in a direction inclined from the axial direction.

Most of the coolant gas discharged into a high-pressure chamber 134A of a cylinder cover 134 is discharged to the outside of the compressor via a D-line 141. The remaining portion is guided via a plurality of gas passages 81B formed in a cylinder 142A to the sliding portion between a piston 139A and the cylinder 142A to thereby form the gas bearing 82. Therefore, no lubricating oil is used as in the fourth embodiment.

In the high-pressure chamber 134A, there are arranged a discharge valve mechanism (as will be called the "valve") 144 and a discharge spring (as will be called the "spring") 145 for urging the valve 144 onto the cylinder 142A.

A second suction tube 146 has one end 146A open into the spring holder 131B in the vicinity of the opposite side of the compression chamber of the cylinder 142A and at its other end 146B open into the closed casing 41. A suction passage 139B is formed in the piston 139A, and a suction valve mechanism (as will be called the "valve") 139C is attached to the piston 139A on the side of the compression chamber 48.

Here will be described the actions of the linear compressor thus constructed.

The flexure bearings 128A and 128B support the magnetic attractions to act in the radial directions of the mover 121, wholly on the two sides. Therefore, the member for transmitting the reciprocation of the mover 121 to the piston 139A need not support the magnetic attractions but is required for only the axial rigidity and may have a low radial rigidity. Therefore, the compliance rod 72 can be used for connecting the piston 139A and the mover 121. As a consequence, even if the mover 121 and the cylinder 142A are axially misaligned or inclined, the rod 72 is so inclined or flexed that the piston 139A and the cylinder 142A may be aligned without any axial inclination. Therefore, the disadvantages in the parts precision or the parts assembly precision are absorbed.

Without improving the parts or their assembly precision, therefore, the side pressures between the cylinder 142A and the piston 139A are reduced to reduce the sliding loss. As a consequence, it is possible to provide a highly efficient compressor and to improve the reliability of the sliding portion better.

Moreover, the rod 72 has a simpler structure than that of the ball joint mechanism but does not have any sliding portion unlike the ball joint mechanism, so that it has a small sliding loss and a high reliability as the connection mechanism.

On the other hand, a portion of the coolant gas discharged into the high-pressure chamber 134A is guided via the gas passages 81B formed in the cylinder 142A, into the small clearance of the sliding portion between the piston 139A and the cylinder 142A. As a consequence, a gas film is formed to constitute a gas bearing 82 to thereby bring the piston 139A and the cylinder 142A into a non-contact state.

The gas bearing 82 is generally evaluated on how little gas quantity and how low gas pressure it can realize the non-contact state in and at. On the other hand, the performances of the gas bearing 82 is changed according to the shape, size and location of the gas passage 81B. It is, therefore, desired that a small sectional area portion corresponding to a sectional area at the level of 30 µm to 200 µm in diameter be arranged in a portion of the gas passage 81B. If the lubricating oil exists in this construction, that small sectional area portion is clogged with the lubricating oil to stop the coolant gas so that the gas bearing 82 does not function. In this embodiment, therefore, not the lubricating oil but only the gas bearing 82 is used.

The piston 139A and the cylinder 142A can be held in the non-contact state, as described above, and the sliding loss between the piston 139A and the cylinder 142A can be reduced substantially to zero. Moreover, the wear of the sliding portion is remarkably reduced to improve the reliability drastically. The effect achieved by applying this construction is higher for a compressor having a higher running frequency and a higher sliding loss.

Moreover, this embodiment has the oil-free construction using no lubricating oil so that it can achieve effects similar to those of the fourth embodiment.

As described above, the sliding loss is reduced substantially to zero. Since the coolant gas is introduced into the sliding portion between the piston 139A and the cylinder 142A, on the other hand, the leakage loss of the sliding portion increases. Since the compressed high-pressure gas is used in the gas bearing 82, the compression loss also increases. However, reduction of those losses can be contained in the design elements on the basis of the aforementioned design know-how of the gas bearing 82.

Exemplary Embodiment 12

Figure 19:
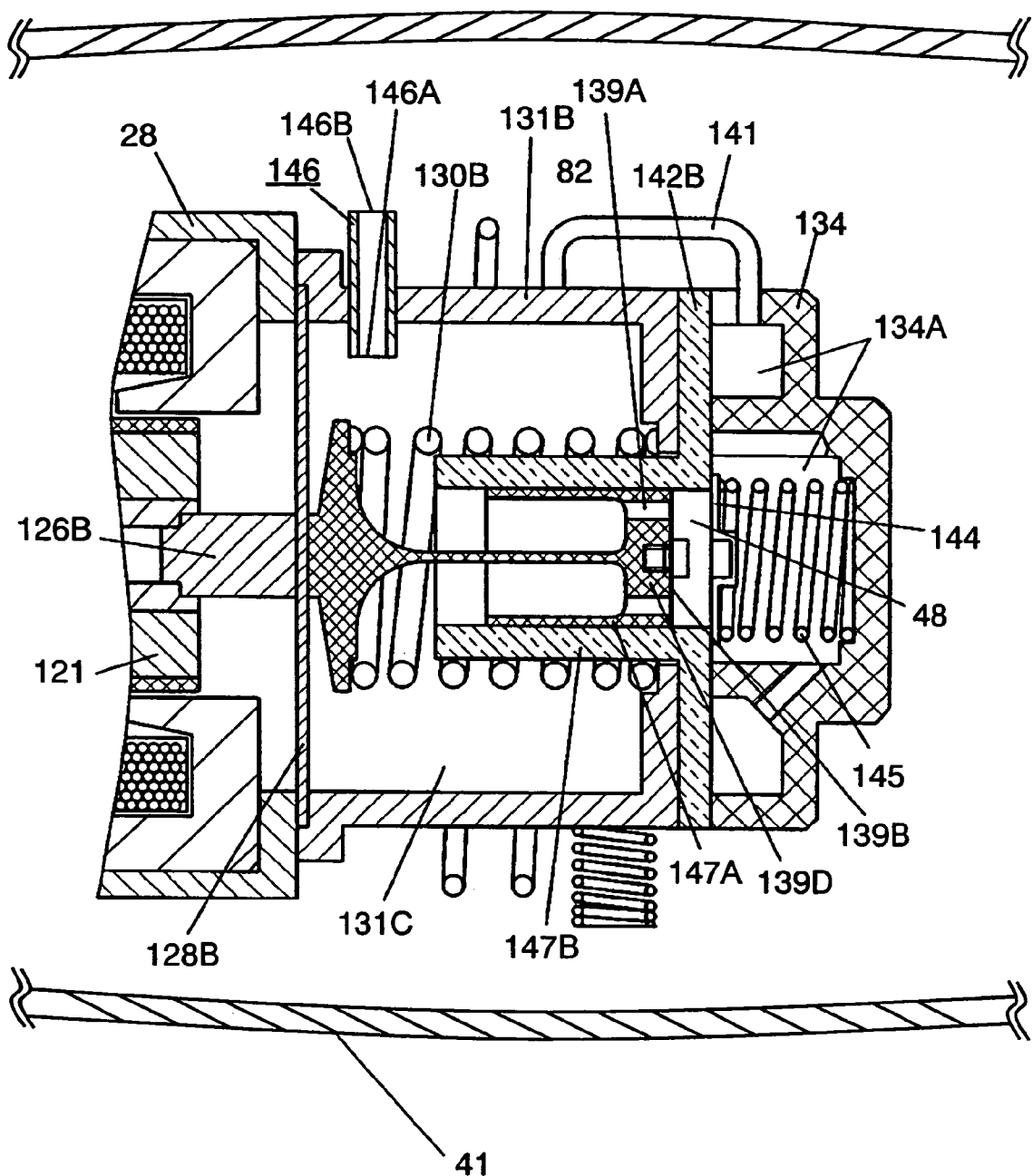
FIG. 19 is a sectional view of an essential portion of a linear compressor according to a twelfth exemplary embodiment of the present invention.

FIG. 19 is a sectional view of an essential portion of a linear compressor according to the twelfth exemplary embodiment of the present invention. This embodiment is constructed similar to the construction of the eleventh embodiment such that the material having the self-lubricating property described in the fifth embodiment and the ceramic material described in the sixth embodiment are applied in place of the gas bearing to the piston and the cylinder, respectively. Specifically, a piston 139D is made of a self-lubricating material 147A, and a cylinder 142B is made of a ceramic material 147B. As a consequence, by the effect of the self-lubricating property and the wear resistance of the ceramic material 147B, the wear of the sliding portion is prevented to retain the reliability even without using any lubricating oil.

The coolant gas sucked into the closed casing 41 is guided via the second suction tube 146 into the vicinity of the opposite side of the compression chamber of the cylinder 142B. And, the coolant gas flows into the compression chamber 47 through the opposite side of the compression chamber of the cylinder 142B, the opposite side of the compression chamber of the piston 139D and the suction passage 139A provided in the piston 139D and the suction valve mechanism 139B.

The coolant gas compressed in the compression chamber 48 opens the valve 144 against the urging force of the discharge spring 145 urging the discharge valve mechanism (as will be called the "valve") 144 toward the cylinder 142B, so that it is discharged into the high-pressure chamber 134A.

Now at a transient running time of a cooling system such as a refrigerator, a running pressure fluctuates, and the piston 139D then reciprocates over a predetermined stroke. In case the running electric current or running voltage of the compressor is controlled, on the other hand, the piston 139D is caused to reciprocate over a predetermined stroke by the control precision or disturbance handling precision.

In this embodiment, the piston 139D can rock in a manner to push out the valve 144. In the aforementioned case, therefore, the collision impact on the piston 139D is damped more than the discharge valve mechanism unable to perform the push-out action. Therefore, the noises due to collision of the piston 139D are reduced, and the reliabilities of the valve 144 and the piston 139D are improved.

Exemplary Embodiment 13

Figure 20:
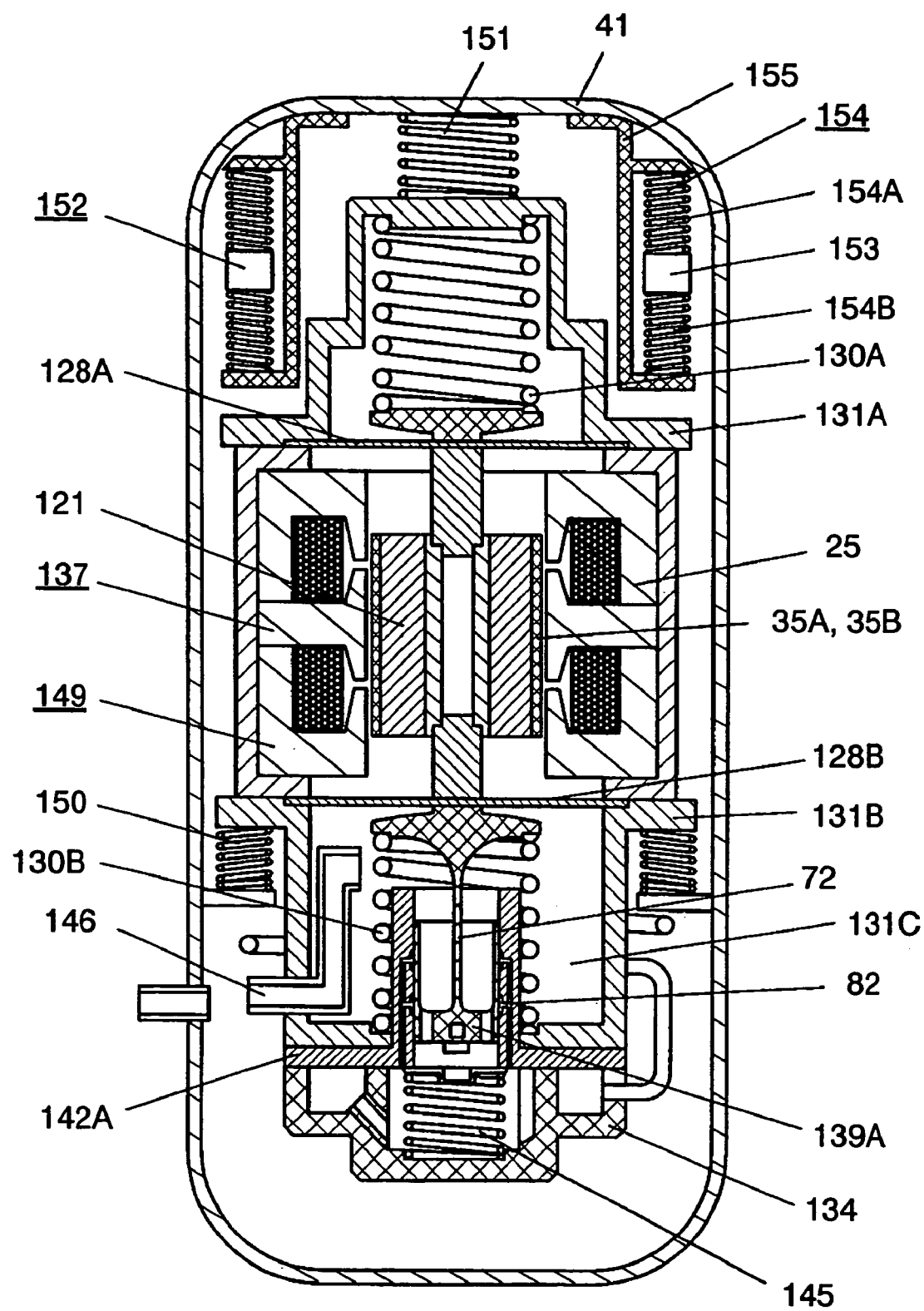
FIG. 20 is a sectional view of a linear compressor according to a thirtieth exemplary embodiment of the present invention.
Figure 21:
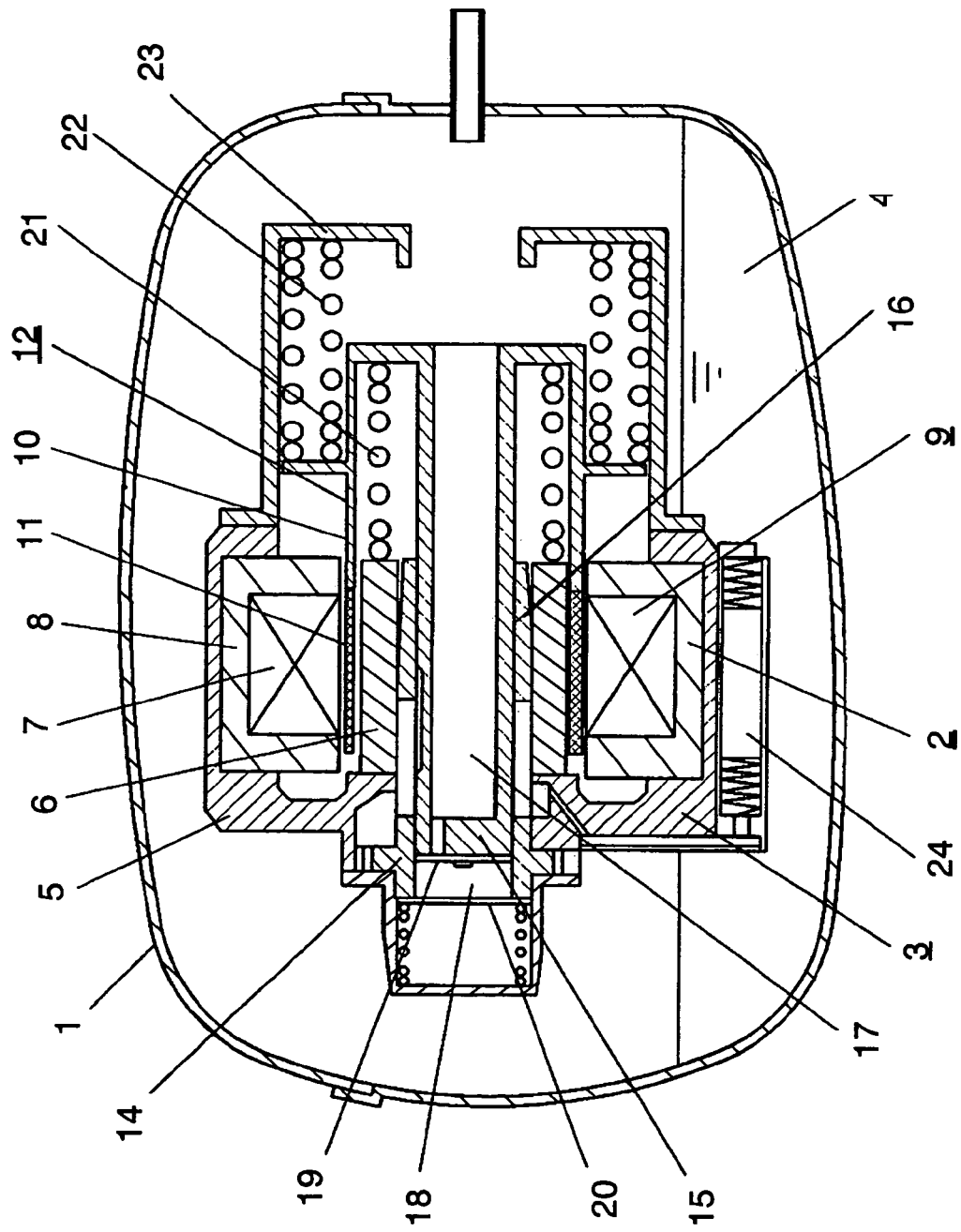
FIG. 21 is a sectional view of a conventional linear compressor.

FIG. 20 is a sectional view of a linear compressor according to the thirtieth exemplary embodiment of the present invention. A compression mechanism unit 149 is so arranged upright in the closed casing (as will be called the "case") 41 that the rocking directions of the mover 121 are identical to the gravitational direction. The compression mechanism unit 149 is internally suspended and supported by a plurality of suspension springs (as will be called the "springs") 150 and a top spring (as will be called the "spring") 151.

A dynamic absorber 152 is composed of a weight 153, a spring 154 and a holder 155, and is formed in an upper space in the case 41. The weight 153 is single or plural and is formed into a generally annular shape or a generally arcuate shape along the inner side of the case 41. The spring 154 is composed of springs 154A and 154B.

In the assembled state or in the stopped linear compressor state, both the springs 154A and 154B are shorter than the natural length and are compressed. As a consequence, the weight 153 is attached to the holder 155 while being clamped by the spring forces of the springs 154A and 154B in the same rocking directions as the rocking directions of the piston 139A. The holder 155 is also formed in a generally annular shape or a generally arcuate shape.

As the weight 153 moves, the spring 154 can be elastically deformed in the rocking directions of the piston 139A. Moreover, the weight of the weight 153 and the sum of the spring constants of the spring 154 in the directions for the piston 139A to rock are so selected that the resonance frequency determined thereby is equal to the running frequency of the linear compressor.

Moreover, the cylinder 142A is inserted and arranged at least partially in a coil spring (as will be called the "spring") 130B.

In this embodiment, the upright arrangement is made so that the rocking directions of the mover 121 are identical to the gravitational direction. As a consequence, the force acting in the radial directions of the mover 121 is the magnetic attractions by the magnets 35A and 35B to act between the mover 121 and the stator 25, but not the gravitational force of the mover 121. Therefore, the radial rigidities of the flexure bearings 128A and 128B supporting the mover 121 and the magnetic attractions can be reduced by the absence of the gravitational force of the mover 121. As a consequence, it is possible to select inexpensive materials, to reduce the sheet thicknesses, to simplify the shapes or to reduce the sizes, for example.

Likewise, the side pressures due to the gravitational force of the piston 139A do not act on the sliding portion between the cylinder 142A and the piston 139A so that the sliding loss is accordingly reduced.

Here will be described the reduction of the vibrations by the dynamic absorber 152.

In the compression mechanism unit 149, the mover 121 reciprocates for compressions with respect to the stator 25. At this time, the stator 25 is vibrated in the reciprocal directions of the piston 139A by the reactions of the reciprocation of the mover 121. The compression mechanism unit 149 is elastically suspended in the case 41 by the spring 150 so that its vibrations are transmitted as the exciting force through the spring 150 to the case 41. By the exciting force thus transmitted to the case 41, the resonance unit composed of the weight 153 and the spring 154 is excited so that the weight 153 vibrates in the reciprocating directions of the piston 139A. At this time, the exciting force transmitted from the spring 150 to the case 41 and the acting force by the vibration of the weight 153 act in substantially equal magnitudes and in opposite phases. As a consequence, the exciting force from the compression mechanism unit 149 is offset by the acting force from the dynamic absorber 152.

The vibration frequency of the case 41 is equal to the drive frequency of the linear compressor. By equalizing the drive frequency of the linear compressor and the rocking frequency of the weight 153 of the dynamic absorber 152, therefore, the effect of the dynamic absorber 152 is maximized to reduce the vibration of the case 41 to the minimum. The resonance frequency is determined by the masses of the case 41 and the weight 153 and the spring constant of the spring 154. By selectively designing the mass of the weight 153 and the spring constant of the spring 154 to be equal to the drive frequency of the linear compressor, therefore, the vibrations of the case 41 are reduced to the minimum.

Here even in case the dynamic absorber 152 is not used, the upright arrangement makes both the rocking directions of the mover 121 and the extending/shrinking directions of the spring 150 identical to the gravitational direction. As a consequence, the vibrating directions of the case 41 also become identical to the gravitational direction. By the simple method of reducing the rigidity of the spring 150, therefore, the vibration transmission of the compression mechanism unit 149 to the case 41 is reduced. In other words, the vibrations of the case 41 are more reduced than in the horizontal arrangement, in which the reciprocating directions of the piston 139A are horizontal.

The dynamic absorber 152 is formed in the upper space of the case 41. In the compression mechanism unit 149, the linear motor 137 is the largest in the radial directions and determines the diametrical size, but the linear motor 137 is not arranged in the upper space of the case 41. As a consequence, dead spaces are formed in the upper and in the lower parts of the case 41 with respect to the radial size of the case 41. By arranging the dynamic absorber 152 in the dead spaces, the case 41 need not be enlarged but can house compactly the dynamic absorber 152 and can reduce the vibrations.

It is especially preferred that the shape of the dynamic absorber 152 be formed into a generally annular shape or a generally arcuate shape along the inner side of the case 41 like the circular shape of the linear motor 137 or the circular shape of the case 41. As a consequence, the dynamic absorber 152 is compactly housed without enlarging the case 41. Moreover, the weight 153 of the dynamic absorber 152 can be enlarged or increased to widen the design range of the resonance frequency, which is determined by the masses of the case 41 and the weight 153 and by the spring constant of the spring 154. As a consequence, the range of the drive frequency for reducing the vibrations of the case 41 by the dynamic absorber 152 is widened to widen the running frequency range of the linear compressor to be driven with low vibrations.

Moreover, the cylinder 142A is inserted and arranged at least partially in the spring 130B. Therefore, the size of the mover 121 can be made smaller in the rocking directions than that of the construction, in which the cylinder 142A is arranged outside of the spring 130B. As a consequence, the case 41 can be small-sized as the linear compressor especially in the rocking directions of the mover 121.

In this embodiment, the dynamic absorber 152 is formed in the upper space of the case 41, but similar effects can be achieved even if the dynamic absorber 152 is formed in the lower space of the case 41.

In this embodiment, the linear motor is arranged upward in the gravitational direction, but the linear motor can be arranged downward in the gravitational direction.

The features of the embodiments thus far described can be combined with an allowable range, and these modifications belong to the invention.

INDUSTRIAL APPLICABILITY

A linear motor of the present invention has: a stator having a stationary iron core and a magnet wire; a mover having a moving iron core and a magnet; and a plate-shaped elastic member for supporting the mover in a manner to rock in the rocking directions. This construction eliminates a sliding portion for supporting the mover so that it can reduce the loss, which might otherwise accompany the reciprocation of the mover. Moreover, a linear compressor using this linear motor is high in efficiency and reliability.

The invention claimed is:

1. A linear motor comprising:
a stator having a stationary iron core and a magnet wire retained on the stationary iron core;
a mover positioned on the inner side of the stator and having a moving iron core and a magnet;
a plate-shaped elastic member for supporting the mover in a manner to rock in rocking directions of the mover;
a coil spring retained at its one end by the mover; and
a spring holder fixed on the stator for retaining another end of the coil spring.

2. A linear motor according to claim 1,
wherein the elastic member supports the mover in a manner so that the mover confronts the stator while a predetermined clearance is maintained between the mover and magnet poles of the stator.

3. A linear motor according to claim 1,
wherein the elastic member is one of a plurality elastic members, and the elastic members are arranged on the two sides of the rocking directions of the mover.

4. A linear motor according to claim 1,
wherein the elastic member is composed of a planar spring.

5. A linear motor according to claim 1,
wherein the elastic member has a plurality of arm portions extended while turning in the same direction from the position at which the arm portions are mounted on the mover, to the position at which the arm portions are mounted on the stator.

6. A linear motor according to claim 5,
wherein the elastic member is one of a plurality elastic members, wherein the elastic members are arranged on two sides of the rocking directions of the mover, and wherein the arm portions of the elastic members are extended while turning in the same direction.

7. A linear motor according to claim 1,
wherein the elastic member is composed of a flexure bearing having a plurality of arms.

8. A linear motor according to claim 1,
wherein magnet poles formed on the inner side of the stator and an outer circumference of the mover are so cylindrical as to share axes with the mover.

9. A linear motor according to claim 1, further comprising:
a moving shaft arranged to extend in the rocking directions of the mover.

10. A linear motor according to claim 1, wherein the coil spring constitutes a first coil spring, and a second coil spring is located at a side opposite the first coil spring with respect to the mover for urging the mover in the rocking directions of the mover.

11. A linear motor according to claim 1,
wherein in a stationary state, the coil spring has a compression size of at least one half of the rocking distance of the mover.

12. A linear motor according to claim 1,
wherein the spring holder has a closed space, the elastic member and the coil spring being housed in the closed space.

13. A linear motor according to claim 10,
wherein in a stationary state, the second coil spring has a compression size of at least one half of the rocking distance of the mover.

14. A linear motor according to claim 6,
wherein the elastic members are mounted with such a deviation in the turning direction that the positions of the arm portions are not identical to each other, as viewed in the axial direction of the mover.

15. A linear motor comprising:
a stator having a stationary iron core and a magnet wire retained on the stationary iron core;
a mover positioned on the inner side of the stator and having a moving iron core and a magnet; and
a plate-shaped elastic member for supporting the mover in a manner to rock in rocking directions of the mover, said elastic member being composed of a flexure bearing having a plurality of arms, said elastic member being connected to said mover.

16. A linear motor according to claim 15,
wherein the flexure bearing supports the mover in a manner so that the mover confronts the stator while a predetermined clearance is maintained between the mover and magnet poles of the stator.

17. A linear motor according to claim 15,
wherein the flexure bearing is one of a plurality flexure bearings, and the flexure bearings are arranged on the two sides of the rocking directions of the mover.

18. A linear motor according to claim 15, wherein the arms of the flexure bearing are extended while turning in the same direction from the position at which the arms are mounted on the mover, to the position at which the arms are mounted on the stator.

19. A linear motor according to claim 5,
wherein the flexure bearing is one of a plurality flexure bearings, wherein the flexure bearings are arranged on two sides of the rocking directions of the mover, and wherein the arm portions of the flexure bearings are extended while turning in the same direction.

20. A linear motor according to claim 19,
wherein the flexure bearings are mounted with such a deviation in the turning direction that the positions of the arm portions are not identical to each other, as viewed in the axial direction of the mover.

21. A linear motor according to claim 15,
wherein magnet poles formed on the inner side of the stator and an outer circumference of the mover are so cylindrical as to share axes with the mover.

22. A linear motor according to claim 15, further comprising:
at least two coil springs for urging the mover to two sides of the rocking directions of the mover.

23. A linear motor according to claim 22,
wherein in a stationary state, the coil springs have a compression size of at least one half of the rocking distance of the mover.

24. A linear motor comprising:
a stator having a stationary iron core and a magnet wire retained on the stationary iron core;
a mover positioned on the inner side of the stator and having a moving iron core and a magnet;
a first plate-shaped elastic member for supporting the mover in a manner to rock in rocking directions of the mover;
a second plate-shaped elastic member for supporting the mover at a side of the mover opposite the first plate-shaped elastic member in a manner to rock in rocking directions of the mover;
wherein the first elastic member has a plurality of first arm portions extended while turning in the same direction from the position at which the first arm portions are mounted on the mover, to the position at which the first arm portions are mounted on the stator,
wherein the second elastic member has a plurality of second arm portions extended while turning in the same direction from the position at which the second arm portions are mounted on the mover, to the position at which the second arm portions are mounted on the stator, and
wherein the first arm portions and the second arm portions are extended while turning in the same direction.

25. A linear motor according to claim 24,
wherein the first elastic member and the second elastic member support the mover in a manner so that the mover confronts the stator while a predetermined clearance is maintained between the mover and magnet poles of the stator.

26. A linear motor according to claim 24,
wherein the first and second elastic members are composed of planar springs.

27. A linear motor according to claim 24,
wherein the first and second elastic members are mounted with such a deviation in the turning direction that the positions of the first arm portions are not identical to the positions of the second arm portions, as viewed in the axial direction of the mover.

28. A linear motor according to claim 24,
wherein magnet poles formed on the inner side of the stator and an outer circumference of the mover are so cylindrical as to share axes with the mover.

29. A linear motor according to claim 24, further comprising:
at least two coil springs for urging the mover to two sides of the rocking directions of the mover.

30. A linear motor according to claim 29,
wherein in a stationary state, the coil springs have a compression size of at least one half of the rocking distance of the mover.

* * * * *

UNITED STATES PATENT AND TRADEMARK OFFICE
CERTIFICATE OF CORRECTION

PATENT NO. : 7,078,832 B2 Page 1 of 1
APPLICATION NO. : 10/493495
DATED : July 18, 2006
INVENTOR(S) : Ko Inagaki et al.

It is certified that error appears in the above-identified patent and that said Letters Patent is hereby corrected as shown below:

Claim 10 in column 22, line 1, please replace "mover for urging" with --mover, for urging--.

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,078,832 B2
APPLICATION NO. : 10/493495
DATED : July 18, 2006
INVENTOR(S) : Ko Inagaki et al.

It is certified that error appears in the above-identified patent and that said Letters Patent is hereby corrected as shown below:

Column 22, line 44, "claim 5" should read --claim 15--; and

Column 22, line 48, "the arm portions" should read --the arms--.

Signed and Sealed this

First Day of July, 2008

JON W. DUDAS
*Director of the United States Patent and Trademark Office*